(12) United States Patent
Friedman et al.

(10) Patent No.: US 11,468,608 B2
(45) Date of Patent: Oct. 11, 2022

(54) MACHINE ARCHITECTURE FOR COMPUTERIZED PLAN ANALYSIS WITH PROVENANCE

(71) Applicant: Smart Information Flow Technologies, LLC, Minneapolis, MN (US)

(72) Inventors: Scott Ehrlich Friedman, Minneapolis, MN (US); Robert Prescott Goldman, Minneapolis, MN (US); Richard Gabriel Freedman, Minneapolis, MN (US); Ugur Kuter, Potomac, MD (US); Christopher William Geib, Minneapolis, MN (US); Jeffrey M. Rye, Minneapolis, MN (US)

(73) Assignee: Smart Information Flow Technologies, LLC, Minneapolis, MN (US)

( * ) Notice: Subject to any disclaimer, the term of this patent is extended or adjusted under 35 U.S.C. 154(b) by 45 days.

(21) Appl. No.: 17/247,015

(22) Filed: Nov. 24, 2020

(65) Prior Publication Data
US 2022/0165007 A1    May 26, 2022

(51) Int. Cl.
G06N 20/20    (2019.01)
G06T 11/20    (2006.01)
G06F 3/04855  (2022.01)
G06F 3/04842  (2022.01)
G06N 20/00    (2019.01)

(52) U.S. Cl.
CPC ........ *G06T 11/206* (2013.01); *G06F 3/04842* (2013.01); *G06F 3/04855* (2013.01); *G06N 20/00* (2019.01); *G06T 2200/24* (2013.01)

(58) Field of Classification Search
CPC .. G06F 16/245; G06F 16/2379; G06F 16/252; G06F 21/62; G06N 20/00
See application file for complete search history.

(56) References Cited

U.S. PATENT DOCUMENTS

| | | | |
|---|---|---|---|
| 2011/0276915 A1* | 11/2011 | Freire | G06Q 10/00 715/772 |
| 2012/0001917 A1* | 1/2012 | Doganata | G06Q 10/101 345/440 |
| 2017/0277857 A1* | 9/2017 | De La Torre | G16Z 99/00 |

(Continued)

*Primary Examiner* — Rinna Yi
(74) *Attorney, Agent, or Firm* — Young Basile Hanlon & MacFarlane, P.C.

(57) ABSTRACT

A computing machine accesses a directed graph representing one or more sequences of actions. The directed graph comprises nodes and edges between the nodes. Each node is either a beginning node, an intermediate node, or an end node. Each intermediate is downstream from at least one beginning node and upstream from at least one end node. Each beginning node in at least a subset of the beginning nodes has an explainability value vector. The computing machine computes, for each first node from among a plurality of first nodes that are intermediate nodes or end nodes, a provenance value representing dependency of an explainability value vector of the first node on the one or more nodes upstream from the first node. The computing machine computes, for each first node, the explainability value vector. The computing machine provides a graphical output representing at least an explainability value vector of an end node.

25 Claims, 26 Drawing Sheets

(56) References Cited

U.S. PATENT DOCUMENTS

| | | | |
|---|---|---|---|
| 2018/0046928 A1* | 2/2018 | Jang | H04L 63/1416 |
| 2019/0034491 A1* | 1/2019 | Griffith | G06F 16/256 |
| 2020/0059481 A1* | 2/2020 | Sekar | H04L 63/1416 |
| 2020/0160215 A1* | 5/2020 | Kotnis | G06F 7/544 |

* cited by examiner

MACHINE ARCHITECTURE FOR COMPUTERIZED PLAN ANALYSIS WITH PROVENANCE

CROSS-REFERENCE TO RELATED APPLICATIONS

The present application is related to U.S. patent application Ser. No. 16/913,925, filed Jun. 26, 2020, and titled "PROVENANCE ANALYSIS SYSTEMS AND METHODS," and U.S. patent application Ser. No. 16/948,297, filed Sep. 11, 2020, and titled "PROVENANCE ANALYSIS SYSTEMS AND METHODS," the disclosures of which are fully incorporated by reference herein.

TECHNICAL FIELD

Embodiments of the present disclosure relate generally to the field of information analysis and visualization, and more particularly to computerized plan analysis while tracking provenance information.

BACKGROUND

Experts in information-rich domains increasingly depend on specialized tools to process data and generate insights. These tools, which can be referred to as software agents, can expedite the work, but may also reduce accuracy, increase risk, increase bias, and increase complexity as more, and more diverse, agents are used in the analysis process.

Despite this increase of risk and complexity, core professional guidelines such as journalistic integrity, legal due diligence, scientific integrity, and U.S. Intelligence Community Directives (ICDs) remain stringent. Provenance, as referred to herein, is a form of metadata (or data about data), that records the origin (or origins) of data, the insights developed from that data, and/or the agents involved in the procurement or development of such data. Understanding the provenance of information insights enables the users of the information to also understand the trustworthiness of each insight.

Frameworks, such as the PROV-O (Provenance Ontology) data model, exist for tracking provenance. Such frameworks attempt to describe the activities in a workflow and the information that each activity uses and produces. Each activity, whether performed by a human or a software agent, can be described as using information produced by previous activities, so these existing provenance frameworks describe a network of activities and information to encode (and display) the lineage and foundations of information.

Such frameworks and conventional systems for visualization of the same, however, are not able to help experts and decision-makers assess the risk, foundations, and confidence of information that was generated by diverse teams of humans and machines.

SUMMARY

Some embodiments relate to a method implemented at one or more computing machines. The method includes accessing, in a graph data repository coupled with the one or more computing machines, a directed graph data structure representing one or more sequences of actions, the directed graph data structure comprising nodes and edges between the nodes, each node being either a beginning node, an intermediate node, or an end node, each intermediate node being downstream from at least one beginning node and upstream from at least one end node, each beginning node in at least a subset of the beginning nodes having an explainability value vector. The method includes computing, for each first node from among a plurality of first nodes that are intermediate nodes or end nodes, a provenance value representing dependency of an explainability value vector of the first node on the one or more nodes upstream from the first node. The method includes computing, for each first node, the explainability value vector, the explainability value vector for the first node being a computational combination of explainability value vectors of one or more nodes upstream from the first node, the computational combination of explainability value vectors being computed by propagating, within the directed graph data structure, values from the explainability value vectors of the one or more nodes upstream from the first node. The method includes providing, using the one or more computing machines, a graphical output representing at least an explainability value vector of an end node.

Some aspects include a machine-readable medium storing instructions to perform the above method. Some aspects include a system comprising processing circuitry and memory, the memory storing instructions which, when executed by the processing circuitry, cause the processing circuitry to perform the above method. Some aspects include an apparatus comprising means for performing the above method.

The above summary is not intended to describe each illustrated embodiment or every implementation of the subject matter hereof. The figures and the detailed description that follow more particularly exemplify various embodiments.

DETAILED DESCRIPTION

Figure 1:
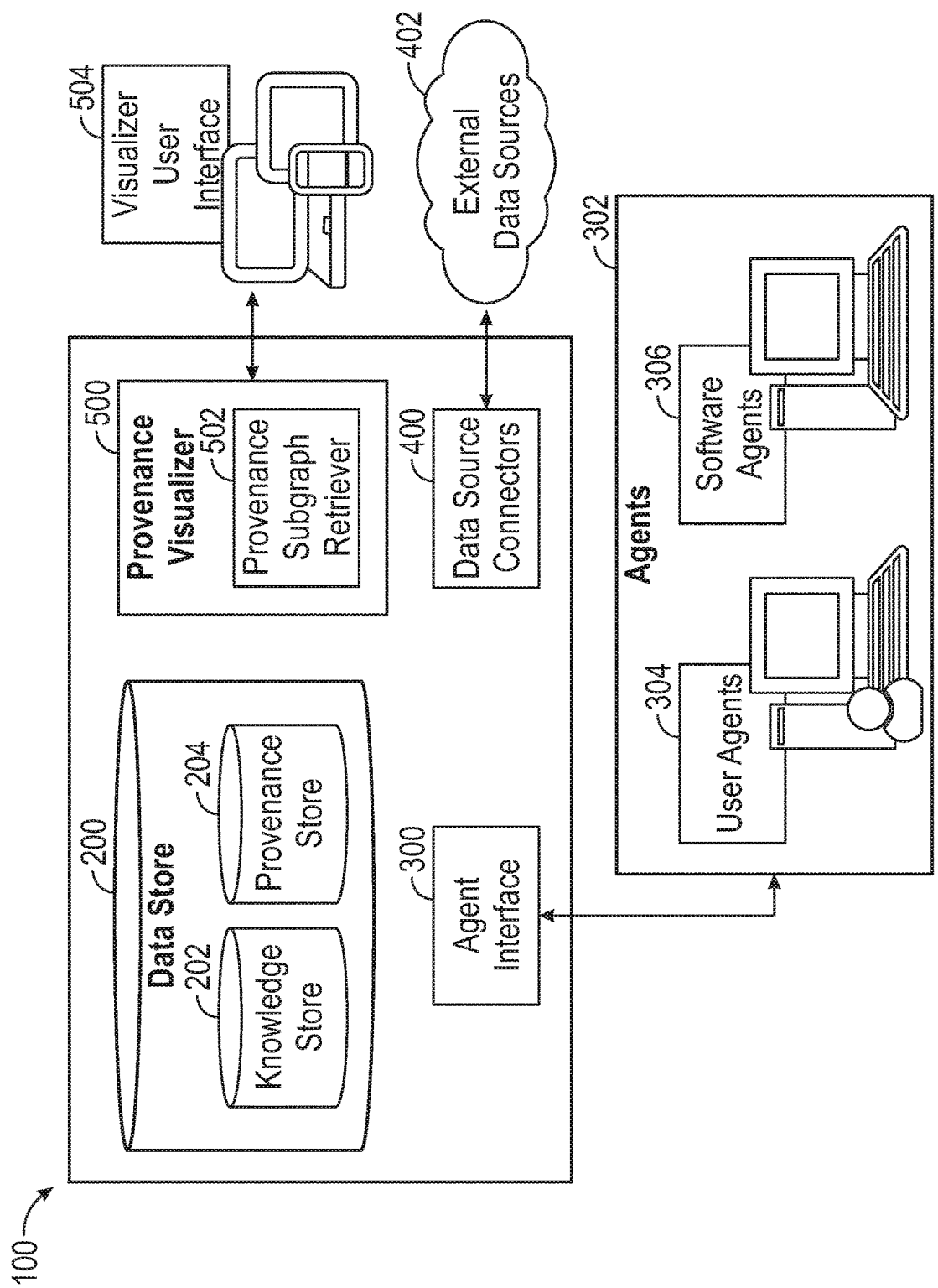
FIG. 1 is a schematic diagram depicting components of a provenance analysis system, according to an embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Many real-world automated planning domains involve diverse information sources, external entities, and variable-reliability human and machine agents, all of which may impact the confidence, risk, and sensitivity of plans. Humans reviewing a plan may lack context about these factors; however, this information is available during the domain generation, which means it can also be interwoven into the automated planner and its resulting plans. Some embodiments are directed to a provenance-based approach to explaining automated plans. Some embodiments, among other things: (1) extend the SHOP3 HTN planner to generate dependency information, (2) transform the dependency information into an established PROV-O representation, and (3) use graph propagation and TMS (Truth Maintenance System)-inspired algorithms to support dynamic and counter-factual assessment of information flow, confidence, and support. Some embodiments qualified the approach's explanatory scope with respect to explanation targets from automated planning and information analysis. Some embodiments have a demonstrated ability to assess the pertinence, sensitivity, risk, assumption support, diversity, impact, and relative confidence of any element of the plan or of the entire plan itself.

According to some embodiments, computing machine(s) access, in a graph data repository, a directed graph data structure representing one or more sequences of actions. The directed graph data structure comprises nodes and edges between the nodes. Each node is either a beginning node, an intermediate node, or an end node. Each intermediate node being downstream from at least one beginning node and upstream from at least one end node. Each node may have an explicit explainability value vector. The computing machine(s) compute, for each first node from among a plurality of first nodes that are intermediate nodes or end nodes, an explainability value vector. The explainability value vector for the first node is a computational combination of explainability value vectors of one or more nodes upstream from the first node. The computational combination of explainability value vectors is computed by propagating, within the directed graph data structure, values from the explainability value vectors of the one or more nodes upstream from the first node. The computing machine(s) compute, for each first node, a provenance value representing dependency of the explainability value vector of the first node on the one or more nodes upstream from the first node. The computing machine(s) provide a graphical output representing at least an explainability value vector and/or a provenance value of an end node.

As used herein, the terms "upstream" and "downstream" may include their plain and ordinary meanings. In a directed graph, Node A is upstream from Node B, and Node B is downstream from Node A, if an entity traversing the graph according to its directionality passes through Node A before Node B.

The technology disclosed herein uses various engines, each of which is constructed, programmed, configured, or otherwise adapted, to carry out a function or set of functions. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

As used herein, the term "computing machine" may include a single computing machine or multiple computing machines. A computing machine may include any device or combination of devices that includes processing circuitry and memory. The processing circuitry and the memory may reside in the same device or in different devices.

Throughout this document, some method(s) (e.g., in FIGS. 9-11 and 18) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

Embodiments of the present disclosure provide systems and methods for distributed provenance tracking of information insights generated by activities performed by a plurality of agents using a variety of information and data inputs. Embodiments can provide confidence propagation, whereby human and software agents can leave attributions regarding sources, activities, or other agents, to express a level of confidence on any item of information involved in an analysis. The insight generating process can propagate confidence attributions downstream and enable the addressing of junctions in variable confidence.

Embodiments can further enable attribute propagation. The information sources, operations (or activities) performed by agents, and data types can be propagated downstream through a provenance chain, such that users can assess the risks and information sources that contributed to any conclusion or evidence. This can enable users to assess the diversity of evidence used to generate any particular insight.

Embodiments can further provide element refutation. The insights generated, and visualization of the provenance thereof, can be dynamically updated as a user temporarily retracts or refutes any activity, agent, or source from the analysis. This can enable the user to assess the effect of the refutation on the generated insights and assess the sensitivity of the analysis to any individual element.

Element refutation can be on an individual or class basis. Embodiments enable the user to temporarily retract classes or groups of data sources, algorithms, agents, or activities. This can enable the user to assess the sensitivity of the analysis to classes of data and algorithms.

One aspect of the present disclosure provides a provenance analysis system. A knowledge store can be provided to store a plurality of datum records, each datum record comprising a unique datum, the datum comprising an indicator of a relationship between a first entity and a second entity. An agent interface can be configured to receive a datum from an agent and store an activity record in a provenance graph. The activity record can comprise an association with the received datum and any input datums used by the agent to generate the received datum.

A provenance subgraph retriever can be configured to receive a selected datum and retrieve a provenance subgraph for the selected datum by recursively identifying each activity record in the provenance graph associated with the selected datum and each activity record in the provenance graph of any input datum of activity record associated with the selected datum.

A provenance visualizer can comprise a display and a user input interface for receiving a selection of a datum. The provenance visualizer can be configured to display the retrieved provenance graph.

In embodiments, that agent interface can be further configured to search the knowledge store to determine if a datum record comprising the received datum exists, and in response to determining that a datum record comprising the received datum does not exist, storing a datum record comprising the received datum in the knowledge store.

In embodiments, a confidence propagator can be configured to receive a trust parameter comprising at least one activity attribute, and apply the trust parameter to the provenance subgraph by augmenting each applicable activity record of the provenance subgraph with a trust modifier based on the trust parameter. An activity record of the provenance subgraph can be an applicable activity record if the activity record has an activity attribute that matches an activity attribute of the trust parameter or if the activity record has an input datum that is associated with an applicable activity record.

In embodiments, augmenting each applicable activity record of the provenance subgraph with a trust modifier based on the trust parameter can include, for each activity record found in a search of the provenance subgraph for any activity records having an activity attribute that matches an activity attribute of the trust parameter: calculating a trust modifier value based on the trust parameter and any existing trust modifier value associated with the activity record and iteratively applying the trust modifier to each child activity record having an input datum that is associated with the activity record.

In embodiments, the trust parameter can comprise a confidence value. Calculating a trust modifier value based on the trust parameter and any existing trust modifier value associated with the activity record can include associating a trust modifier value of 1 the activity record if no existing trust modifier value is associated with the activity record then multiplying the confidence value by each trust modifier value associated with the activity record.

In embodiments, the user input interface is can be further configured to receive the trust parameter, and the provenance visualizer can be further configured to alter the display of the provenance subgraph based on the trust modifier of each activity record.

In embodiments, the trust parameter can indicate a confidence in a datum. In embodiments, each activity record can further comprise an identifier of the agent and the trust parameter can include a value indicating a confidence in activities performed by an agent. In embodiments, each activity record can further include a class of the agent and the trust parameter can include a value indicating a confidence in activities performed a class of agents. In embodiments, each activity record further includes a class of operation performed by the agent and the trust parameter can include a value indicating a confidence in a class of operations. In embodiments, each activity record further can include a source of any input datum associated with an activity, and the trust parameter can include a value indicating a confidence in a source.

In some embodiments, a conflict detector can be configured to indicate one or more conflicting datums in the provenance graph.

One aspect of the present disclosure includes a method for visualizing the provenance of a datum record in a knowledge store. The method can include providing a knowledge store for storage of a plurality of datum records, each datum record comprising a unique datum, the datum comprising an indicator of a relationship between a first entity and a second entity, receiving a datum from an agent, and storing an activity record in a provenance graph. The activity record can include an association with the received datum and any input datums used by the agent to generate the received datum.

The method can further include receiving an identifier of a selected datum and retrieving a provenance subgraph for the selected datum by recursively identifying each activity record in the provenance graph associated with the selected datum and each activity record in the provenance graph of any input datum of an activity record associated with the selected datum, and displaying the generated provenance graph, by a provenance visualizer comprising a display and a user input interface for receiving a selection of a datum record.

FIG. 1 is a schematic diagram depicting components of a provenance analysis system 100, according to an embodiment. Provenance analysis system 100 can comprise data store 200, agent interface 300, data source connectors 400 and provenance visualizer 500 in embodiments. Components and subcomponents of system 100 are described in more detail below.

The various components and engines of system 100 can reside on, or be executed by, a single computing device in embodiments. In other embodiments, the components and engines of system 100 can reside on, or by executed by, a plurality of computing devices in continuous or intermittent, wired or wireless, data communication with each other such that the systems and methods described herein can be executed in parallel.

System 100 can present one of more user interfaces to various users. Each user interface can be a command line interface, a graphical user interface, a web browser accessible interface, an augmented reality interface, or any other interface that can receive user input and present outputs of system 100 to the user. In an embodiment, each user interface can be a programmatic interface, such that the user can be a computing system, robot, or other electronic device.

For example, as described in further detail below, each of user agents 304 and visualizer user interface 504 can comprise a user interface executed by a computing device in association with system 100.

Figure 2:
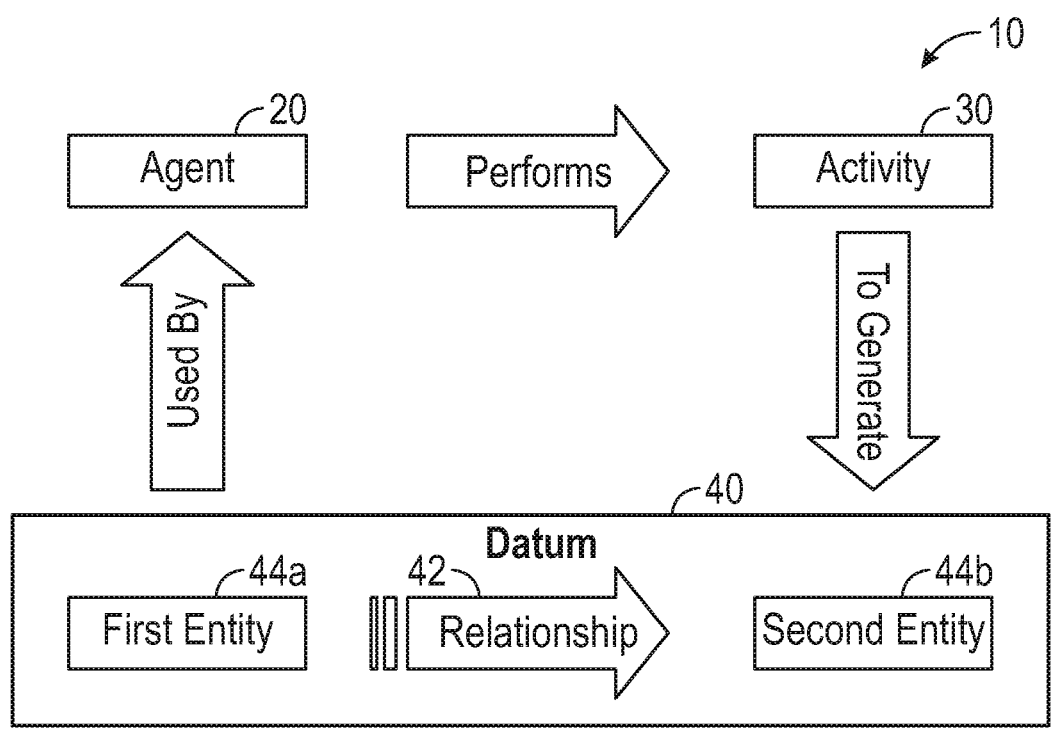
FIG. 2 is a schematic diagram depicting an information analysis cycle, according to an embodiment.

FIG. 2 is a schematic diagram depicting an information analysis cycle 10, which may be supported or implemented by provenance analysis system 100, according to an embodiment. As depicted, an agent 20 can perform an activity 30 using datum 40 as an input. Each datum 40, can be provided to system 100 as an axiom, or generated by one or more activities 30. Embodiments of provenance analysis system 100 may support or implement additional or alternate information analysis cycles.

A datum 40 can represent an item of information about the world, which can be represented by a relationship 42 between a first entity 44a and a second entity 44b. As an example, a datum may represent an assertion that the Earth resolves around the Sun as a tuple: <first entity 44a>, <relationship 42>, <second entity 44b>→{"Earth", "revolves around", "Sun"}. Other examples of datums are provided in Table 1 below, which is not intended as an exhaustive set of entities, relationships, or datums, usable by system 100. It should be noted that these triple based representations can also capture more complex relationships. For example, an event may have an agent, a patient, and a beneficiary. These may be identified by reifying the relationship as a thing and relating these rules to that thing and/or directly to each other. It should be noted that this triple based structure doesn't limit the kinds of information or system can handle.

TABLE 1

| First Entity | Relationship | Second Entity |
|---|---|---|
| Earth | revolves around | Sun |
| Earth | is a | planet |
| The city of Chicago | is located in | The state of Illinois |
| The state of Illinois | is located in | The United States of America |
| Lady Ada | is a | Ship |
| Lady Ada | is located in | The United States of America |
| Lilliput National Space Administration | operates | Mildendo Satellite Launch Center |

Returning again to FIG. 1, data store 200 can comprise one or more database, file systems, memories, or other data storage systems known in the art. Data store 200 can comprise a single data store, present on a single computing device in an embodiment. In other embodiments, data store 200 may be present on one or more database systems physically separate from other components of system 100. In other embodiments, data store 200 may be present distributed across multiple separate computing devices, each with associated data stores. In embodiments, data store 200 may comprise one or more relational databases with tabular structure, NoSQL, or other non-relational databases with key-value, grid, or other structures.

Data store 200 can comprise logical groupings of data comprising knowledge store 202 and provenance store 204. Numerous types and structures of data, that can be stored, indexed, and through embodiments of data store 200. Where, as depicted or described, data structures are said to include or be associated with other data structures, it should be understood that such other data structures may be stored within or in association with each data structure, or may be referenced by other data structures through the use of links, index values, pointers, or addresses, or other forms of referencing data.

Figure 3:
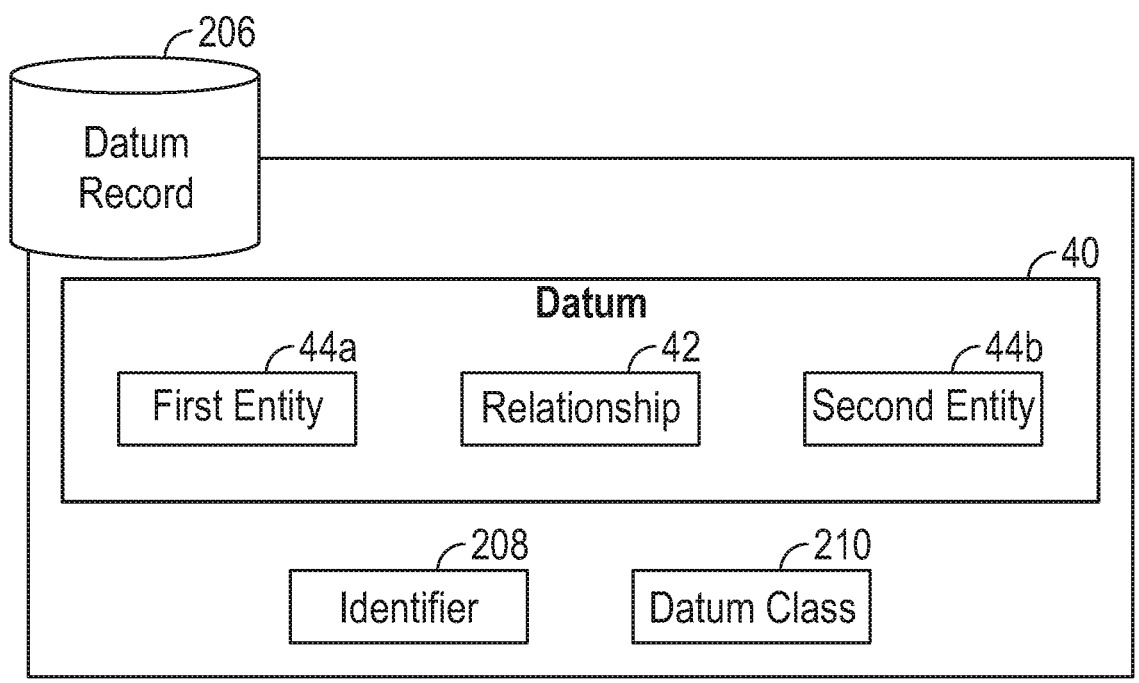
FIG. 3 is a schematic diagram depicting a datum record, according to an embodiment.

FIG. 3 is a schematic diagram depicting a datum record 206 according to an embodiment. Knowledge store 202 can comprise one or more datum records 206. Each datum record can include a datum 40 including relationship 42, first entity 44a, and second entity 44b, as well as a unique identifier 208 and datum class 210. Each of relationship 42, first entity 44a and second entity 44b can be stored as text, numeric, or other data structures within knowledge store 202. In embodiments, knowledge store 202 can comprise on or more tables or other data structures for storing, organizing, arranging, or linking information about relationships 42 and entities 44 as can be received through datums 40. For example, knowledge store 202 can store, receive, and/or provide data in a structured data format such as a WIKIBASE data model.

Each datum record 206 can be generated, read, processed, or analyzed by agents 302. In embodiments, each datum 40 can be associated with exactly one datum record 206, in other embodiments, each datum 40 can be associated with multiple datum records 206. Datums 40 can be stored as separate database elements, and each datum record 206 can comprise a link to the datum 40. In other embodiments, each datum 40 can comprise a set, list, array or other data structure comprising links or references to one or more datum record 206 associated with the datum 40.

Identifier 208 can be a pointer, address, primary key, or other data element useful for uniquely identifying datum record 206. Identifier 208 can be a subject identifier, which can be expressed in a URI (universal resource indicator) style format, such as "subj://<context>::<id>", for example, subj://lore:base::guru:JennaAnalyst.

Datum class 210 can be an indicator of what type of information is provided by the datum 40. For example, each datum 40 can be an external data record, or an insight generated or provided by the activities of one or more agents, such as a handle, belief, qualifier, or conflict.

A handle datum can be placeholder for an event, entity, or location in the world (e.g., "Lady Ada," or "United States of America (USA)"). There may be many data sources 402 with entries about each a given entity, and the handle for the entity can enable the user to unify these entries under a common element in order to maintain separation but allow fusion across data sources.

A belief datum can be generated as the result of one or more agent operations, such as an assertion, or an inference.

A conflict datum can comprise a link between two datums that cannot both be true. For example, <Lady Ada, Location, USA> and <Lady Ada, Location, Italy>.

A data entry datum can be an external data entry that can represent or store axiomatic information that is provided to data source connectors 400 from external sources 402 such as databases, sensor feeds, news outlets, or the like.

A qualifier datum can comprise a link between a datum record 206, and one or more other datum records 206 that might qualify the datum record. For example, if an external data record is known to only be valid for a particular time period, any insights generated using the external data record may be qualified based on that date period. As an example, the: <Lady Ada, Location, USA> datum may have an associated qualifier datum that indicates that this is only known for a time period of May 15, 2019-May 22, 2019.

Figure 4:
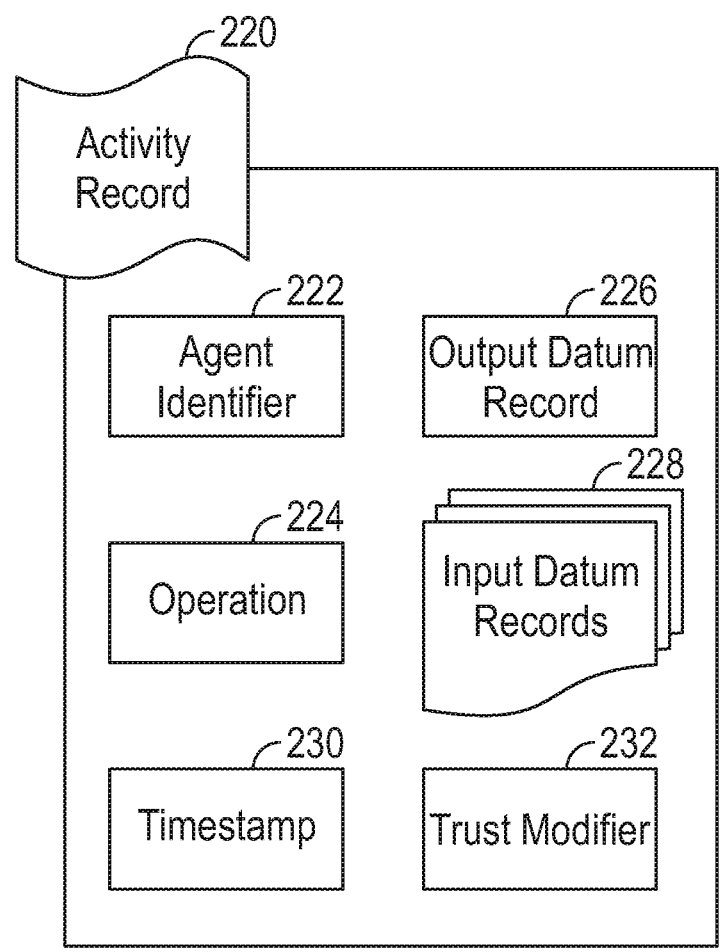
FIG. 4 is a schematic diagram depicting an activity record, according to an embodiment.

FIG. 4 is a schematic diagram depicting the data structure of an activity record 220 according to an embodiment. Provenance data store 204 can provide storage for activity records 220. Activity record 220 can represent or store information regarding a particular instance of an activity or operation that was executed on the system to produce a datum 40. Each activity record 220 can include an agent identifier 222 identifying the agent 302 associated with the activity, information about the operation 224 performed, output datum record link 226 associating the activity record 220 with the datum record(s) generated by the activity, and input datum record links 228 associating the activity record with any datum records 206 used by the agent 302 during performance of the activity. Each activity record 220 can further include timestamp 230 and trust modifier 232. Activity records 220 can comprise data entries compatible with the PROV-O ontology or other data format compatible with the PROV data model.

Operation 224 can be a label recording the name or class of operation performed. Operation classes supported by system 100 can include: ingest operations, inference operations, and assertion operations in an embodiment.

Ingest (or ingestion) operations can be performed by agents 302 to process one or more external data sources 402 to generate one or more datum records 206. For example, a Wikidata Agent can be configured to ingest a data source structured according to a WIKIBASE data model to create a datum record 206 for each of a set of keywords.

Assertion operations can be performed by agents 302 to provide one or more datum records 206 directly. A user agent 304 can enable a user to assert one or more facts that can be recorded as datum records 206. For example, a user may assert that a certain ocean-going vessel was in a particular harbor on a particular date because the user saw the vessel in that harbor, or because the user received other information that supports the assertion.

Inference operations can be performed by agents 302 to produce belief records based on datum records 206 and one or more rules. Inference operations can include parsing text as well as inferring links based on user or machine generated rules.

The various operations performed by agents 302 can further be categorized by particular processing methods or sources of data. For example, in embodiments, operation categories can include open source intelligence (OSINT), social intelligence (SOCINT), social media intelligence (SMINT), human intelligence (HUMINT), signals intelligence (SIGINT), measurement and signatures intelligence (MASINT), geospatial intelligence (GEOINT), or other technical intelligence disciplines. In addition, operation categories can include processing types such Gaussian, Bayesian, or other statistical filtering, or various machine-learning techniques such as supervised, unsupervised, or reinforcement learning. In embodiments, operations or the agents performing them can be categorized based on particular machine-learned, or human-provided models, and/or criteria of the data or techniques used in training the model.

The association between activity record 220 and output datum record 226 is depicted, conceptually, as part of activity record 220, in embodiments, each datum record 206 can comprise a link or reference to the generating activity record 220. In yet other embodiments, a separate data structure or element (such as a linking table) can store associations between activity record 220 and output datum records 226. Similarly, the association between activity record 220 and any input datum records 228 can be stored as a link or reference within activity record 220 and/or within datum records 206, or in a separate data element entirely.

Timestamp 230 can record the time and date of execution of the activity. Timestamp 230 can include multiple time entries, such as a first timestamp recording the beginning of the activity, and a second timestamp recording the completion of the activity.

Trust modifier 232 can be a value or other data relating to attributions, confidence measures, or other information directly applied or propagated to activity record 220 as described in more detail with respect to FIG. 11 below.

Figure 5:
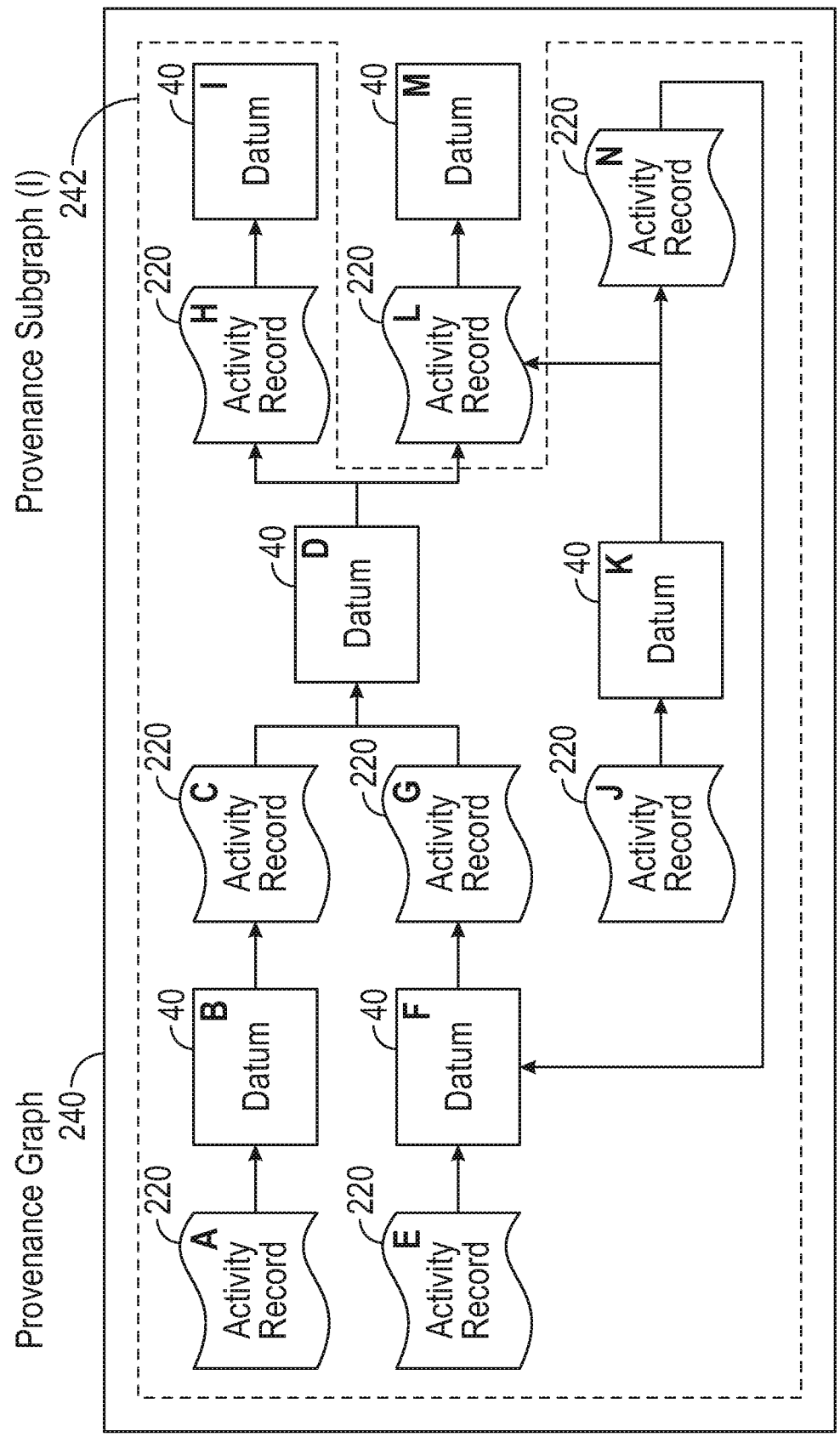
FIG. 5 is a schematic diagram depicting a provenance graph, according to an embodiment.

FIG. 5 is a schematic diagram depicting an example of a provenance graph 240 as can be stored, generated and/or retrieved by embodiments. Provenance graph 240 comprises one or more activity records 220 as associated with one or more datums 40. Each datum 40 can be an associated with an output datum record 226 of activity record 220, or an input datum record 228 of activity record 220. Provenance graph 240, therefore, can be traversed using one or more graph traversal techniques known in the art to determine a set of activities 30 and datums 40 that depend on the operation of a specific activity record 220, or determine one or more changes of activity records 220 that resulted in a particular datum 40. In particular, a provenance subgraph 242 can be retrieved for a selected datum 40 by traversing provenance graph 240 from a selected datum 40, through each activity record 220 and input datums 40 that the selected datum 40 depends on. Each provenance subgraph 242, therefore, can comprise a set of lists, chains, arrays, or other directed data structures with each element in the set representing one provenance path.

In embodiments, provenance subgraph 242 can be provided to visualizer user interface 504 for display. In embodiments, provenance subgraph 242 can contain all of the data for each activity record 220 within provenance graph 240, in order to minimize processing resources used for data lookup. In other embodiments, provenance subgraph 242 or can include only pointers or links to data within provenance graph 240 in order to reduce the amount of data transmitted. In yet other embodiments, the amount of data provided with provenance subgraph 242 can be adjusted manually or automatically based on parameters such as the processing speed of visualizer user interface 504, and/or the connection speed between visualizer user interface 504 and other components of system 100.

For example, as depicted in FIG. 5, activity record A generates datum B, which is used as an input to activity record C, which produces datum D. Independently, activity record E generates datum F, which is used as input to activity record G, which also produces datum D. Datum D is used by activity record H to produce datum I. Datum D is also used by activity record L (in conjunction with datum K as produced by activity record J) to produce datum M. Datum K is also used by activity record N, which independently produces datum F.

A provenance subgraph 242 for datum I, as may be produced by embodiments includes the following set of provenance paths: {{A,B,C,D,H}, {E,F,G,D,H}, {J,K,N,F, G,D,H}}. Each path of the provenance subgraph is a well-formed explanation describing the provenance of datum I. As such, the discrete provenance paths for datum I enable reasoning based on the datums and activities on which I depends. For example, each of the provenance paths for determining I involved datum D and activity H. If datum D is determined to be false, or some attribute of activity H (such as the agent, the type of operation performed, or the like) was determined to be less trustworthy, it could be determined that I is less likely to be correct. On the other hand, activity E is less essential to deriving I, as two alternative paths to I exist, one of which does not require activity E. Provenance graph 240, enables system 100 to automatically determine and display the implications of confidence or trust attributions as applied to any element in the provenance subgraph 242 for a given datum 40.

Figure 6:
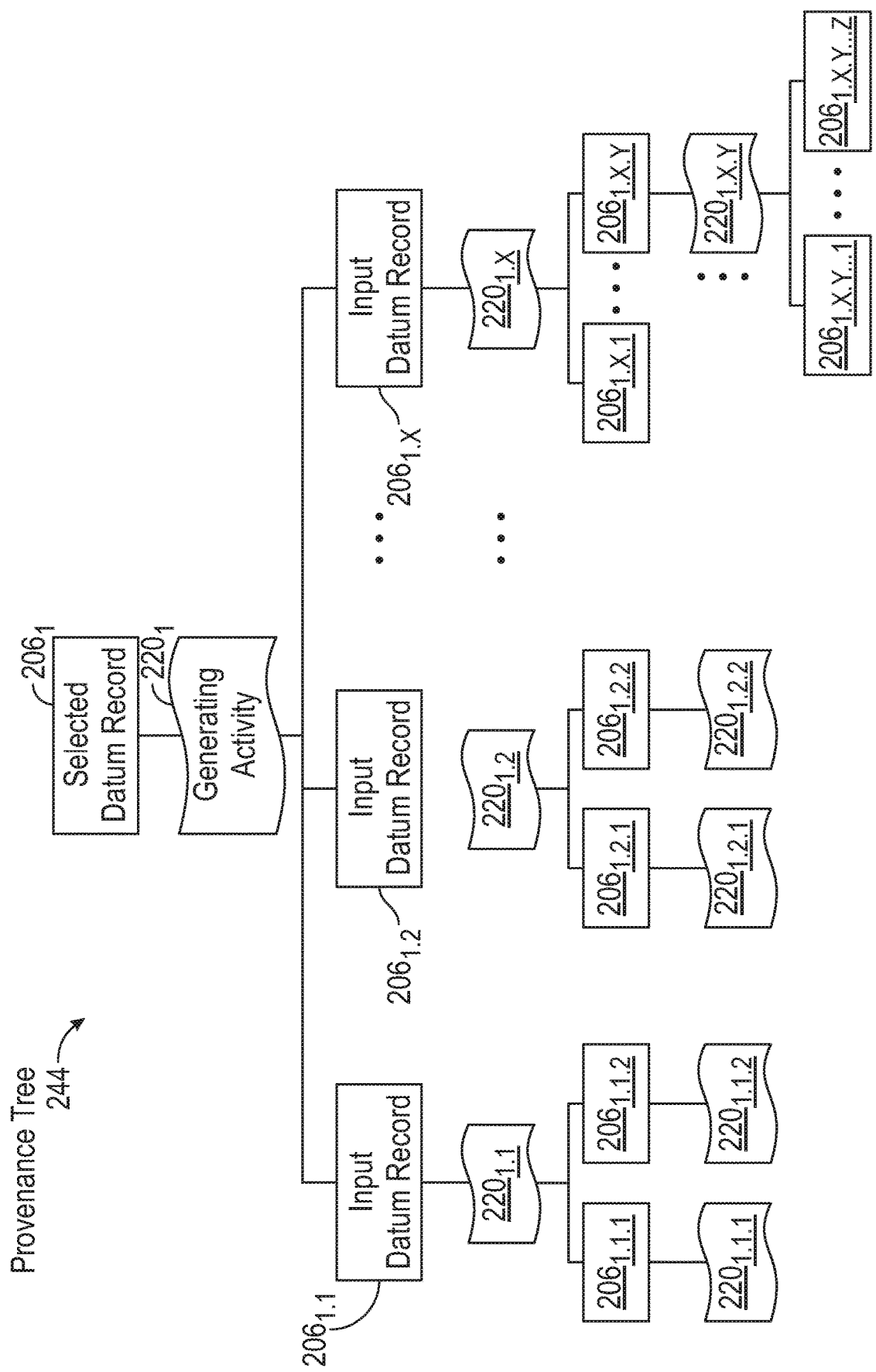
FIG. 6 is a schematic diagram depicting a provenance tree, according to an embodiment.

In certain embodiments, each datum record 206 can be a unique element created by a particular instance of an activity. Each datum 40, therefore, can be associated with multiple datum records 206. As depicted in FIG. 6, provenance relationships for a selected unique datum record 206 can be depicted in the form of a provenance tree 244. In the example provided in FIG. 6, the generating activity $220_1$ of the selected datum record $206_1$ can be found. Generating activity $220_1$ includes multiple input datum records $206_{1.1}$-$206_{1.x}$. Provenance graph 240 and provenance subgraph 242 can therefore be generated by traversing the provenance trees 244 for a selected datum record, and any equivalent datum records. An equivalent datum record 206 can be any datum record 206 including a datum 40 defining the same relationship 42 between the same first entity 44a and second entity 44b. In embodiments, equivalent datum records can be determined by performing a search of knowledge store 202. The provenance subgraph 242 for a selected datum record 206 can therefore comprise a collection of all of the sets of lists of activity records for each selected datum record 206 and its equivalents.

Figure 7:
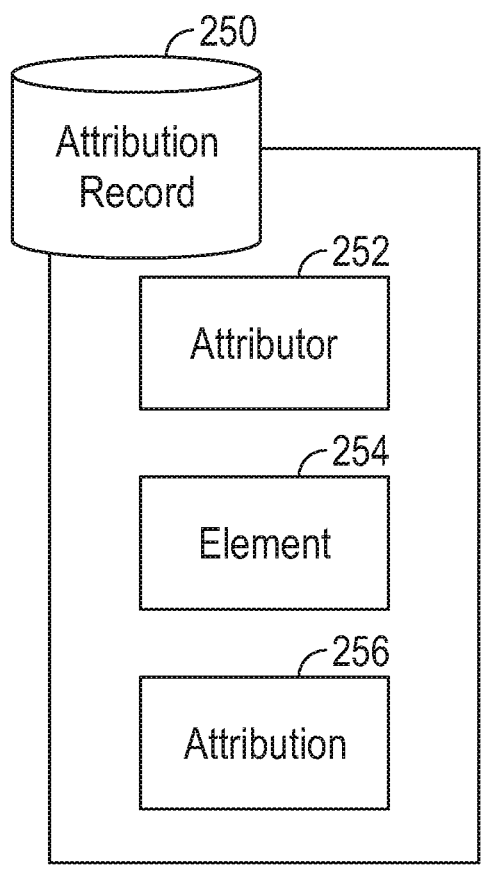
FIG. 7 is a schematic diagram depicting an attribution record, according to an embodiment.

FIG. 7 is a schematic diagram depicting the data structure of an attribution record 250 according to an embodiment. Attribution record 250 can represent or store attribution or confidence values assigned to datums 40, datum records 206, classes of datum, agents 302, classes of agent, classes of operations, or sources of data. Attributor 252 can be a link or value identifying an agent 302 (whether human or software) that provided the attribution. Element 254 can be a link or value identifying the record or class to which the attribution applies. Attribution 256 can comprise a confidence value, such as an integer or decimal value between one and ten, or one and one-hundred, a letter grade (A, B, C, D, F . . . ), a color rating, or any other relative value. In embodiments, attribution 256 can be a value on a standard scale. One such scale is provided in ICD 203 (U.S. Office of the Dir. of Nat'l Intelligence, *Intelligence Community Directive* 203: *Analytic Standards* (Jan. 2, 2015)), though other scales can of course be used. Attribution 256 can further comprise text-based data including explanations, justifications, assumptions, and statements of bias, which can be stored to provide further information to reviewers.

Element 254 can be mapped to one or more attributes of activity record 220. For example, element 254 can refer to a datum 40, and any activity records 220 that have that datum associated as an input datum can be applicable to, or associated with, attribution record 250. Element 254 can be an identifier of an agent or class of agents, such that activities performed by that agent or class of agents are applicable to attribution record 250. Element 254 can be an identifier of a class of operations, and any activities that perform an operation in that class can be applicable to attribution record 250. Element 254 can be an identifier of a data source or class of data source, and any activities that rely on that data source or class of data sources can be applicable to attribution record 250. Element 254, therefore, can comprise a link, pointer, or other data field that can identify on or more attributes, traits, or characteristics of activity records 220 to which attribution record 250 can apply.

Returning now to FIG. 1, agent interface 300 can be an intermediary between agents 302 and other components of system 100, such as data store 200. Agents 302 can be user agents 304 or software agents 306 (software agents 306 can also be referred to as machine agents, or artificial intelligence agents). User agents 304 can comprise user interfaces enabling users of system 100, or users of other systems capable of interfacing with system 100 to provide information to system 100. Software agents 306 can comprise one or more scripts, programs, machine instructions, or other executable code that can receive information to be processed, for example in the form of datum records 206, perform one or more activities to create new datum records 206 as recorded in activity records 220.

Agent interface 300 can present or expose one or more application programming interfaces (APIs) to receive information from, and provide information to system 100. Datums 40 provided by software agents 306 can be stored in knowledge store 202 in datum records 206, and activity records 220 can be generated.

While agent interface 300 is depicted, schematically as separate from software agents 306, it should be understood that agent interface 300 can comprise one or more libraries, scripts, modules, packages, or other resources that can be incorporated into or executed by independent software agents 306, or user-control user agents 304. Agent interface 300 therefore, can comprise a wrapper, or scaffolding, providing an encapsulation layer between the algorithms, methods, and workflows of individual agents 300 and the internal storage structures and protocols of system 100.

In one embodiment, agent interface 300 can be a centralized coordinator such that software agents 306 can register to be invoked based on one or more triggers. For example, software agents 306 can register to be invoked when certain datum records 206 or classes of datum records 206 are added, removed, or updated, Other software agents 306 can register to be invoked on a scheduled basis (for example, agents 306 can be polled once per minute, hour, day, or any other interval). Similarly, agent interface 300 can advertise or publish lists or sets of data or classes of data that has been updated within a set period of time.

In other embodiments, software agents 306 can be invoked, executed, or operated independently of system 100, and connect to agent interface 300 to provide datums 40 without being invoked directly by agent interface 300.

Software agents 306 can also be configured to use top-down automated planning in embodiments. Agents 306 can be configured to find work (such as updated information) and coordinate with (by invoking) one or more additional agents using a scripted workflow. For example, a first agent can be configured to detect updates to a publicly available data source, such as a social media ingestion agent that is configured to monitor for social media content that meets particular criteria (such as, content bearing particular tags, or posted by particular users. When the source is updated, the first agent can co-ordinate the execution of one or more child agents, such as parsers, pattern matchers, and the like, to process any updated data. The first agent can then provide any extracted datums 40 to system 100 via agent interface 300.

Agents 302 can execute in parallel with other components of system 100. For example, each agent 302 can be executed within a separate physical or virtual computing environment with respect to other agents, or system 100. Agents 302 can communicate with other components of system 100 via wired or wireless networks, local or remote procedure calls, shared file system entries, physical ports, or the like. Such parallel processing can provide improvements to the scalability and reliability of system 100, as dependence on individual computing environments can be lessened. Similarly, the reliability of individual agents can be evaluated by comparing the result provided by two or more agents from performing similar data operations using similar data.

In embodiments, the access of data within knowledge store 202 and/or external data sources 402 by agents 300 can be secured to prevent unwarranted dissemination of information. For example, agents 302 may be required to authenticate prior to accessing datum records 206, or even information including the identifiers of datum records 206 that have received updates. Communications between agents 300, components of system 100, and external data sources 402 can be cryptographically secured in embodiments.

FIGS. 8A-8F are schematic views depicting example screens that may be presented by a user agent 304, in embodiments. A user agent 304 can be a software product executing on a computing system with a user interface to display information to and receive information from a user. For example, user agent 304 can be computer application, a web application, or a mobile application in embodiments. Each of the various screens depicted can be arranged on a display in a single window, separate windows, or other arrangement.

Figure 8A:
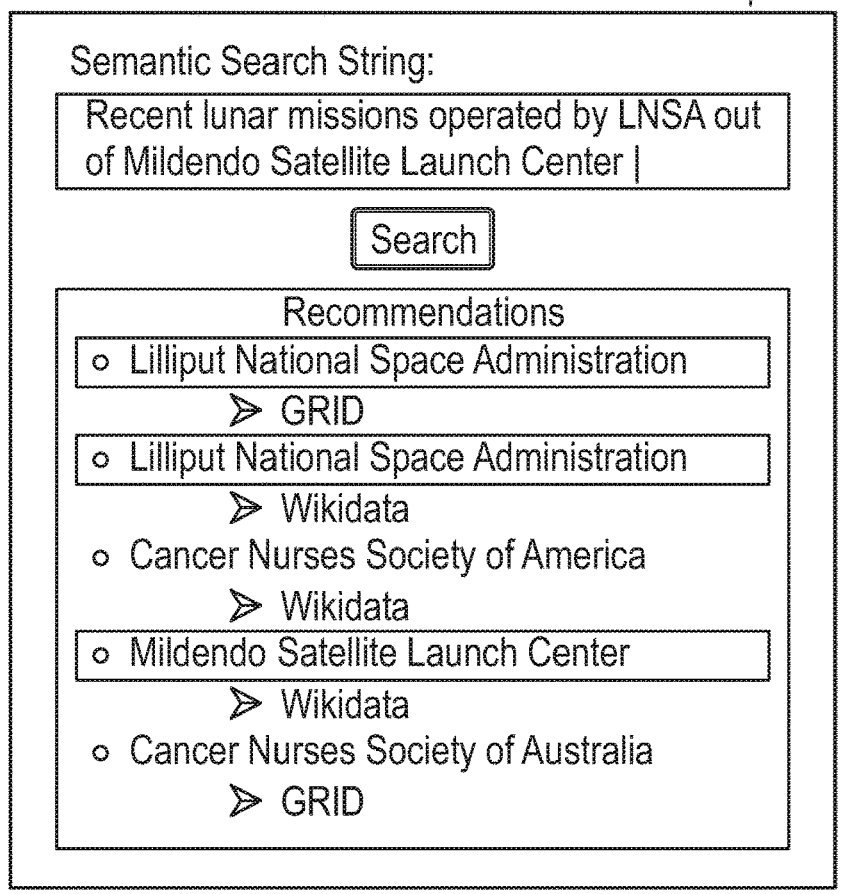
FIGS. 8A-8F are mockups depicting screens of a user agent interface, according to an embodiment.
Figure 8B:
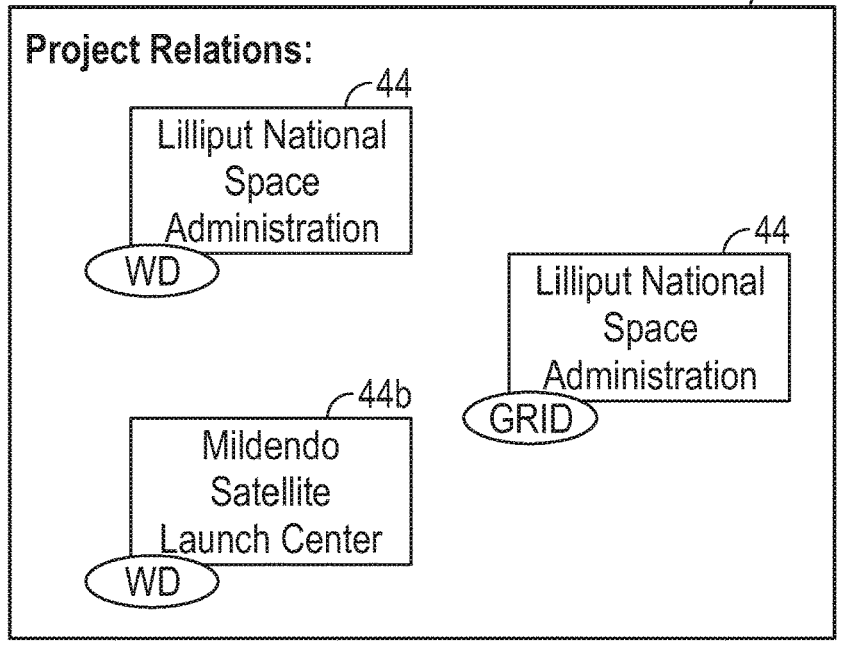

FIG. 8A depicts a search screen 310, enabling a user to enter a search string and, in embodiments, receive the results of a semantic search. As depicted, the user has entered "Recent lunar missions operated by LNSA out of Mildendo Satellite Launch Center," and a number of recommended results are provided. As depicted, three entries have been selected by the user. FIG. 8B depicts a project relations screen 312, according to an embodiment. The three selected entries are depicted as entities 44.

Figure 8C:
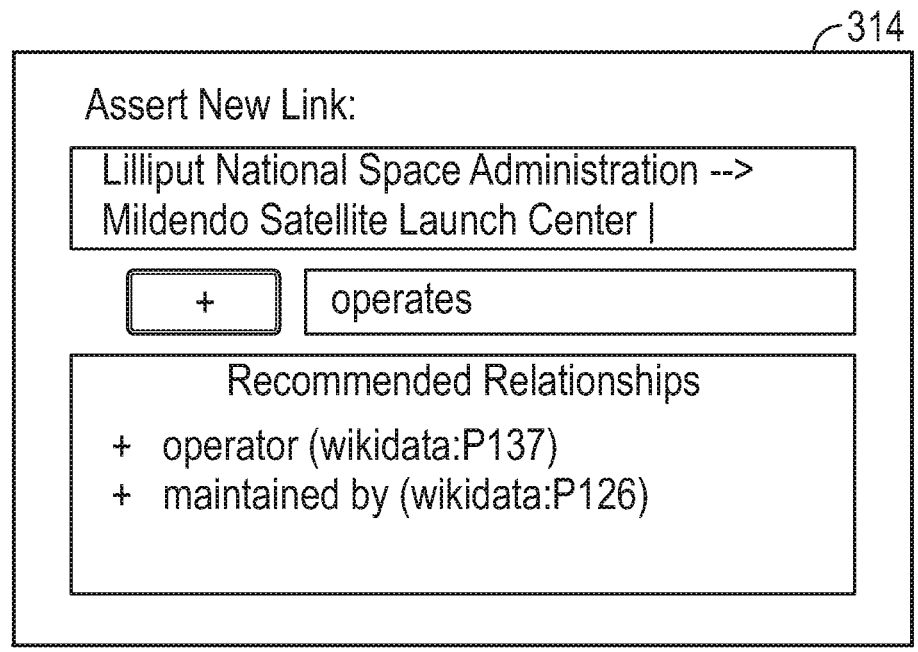
Figure 8D:
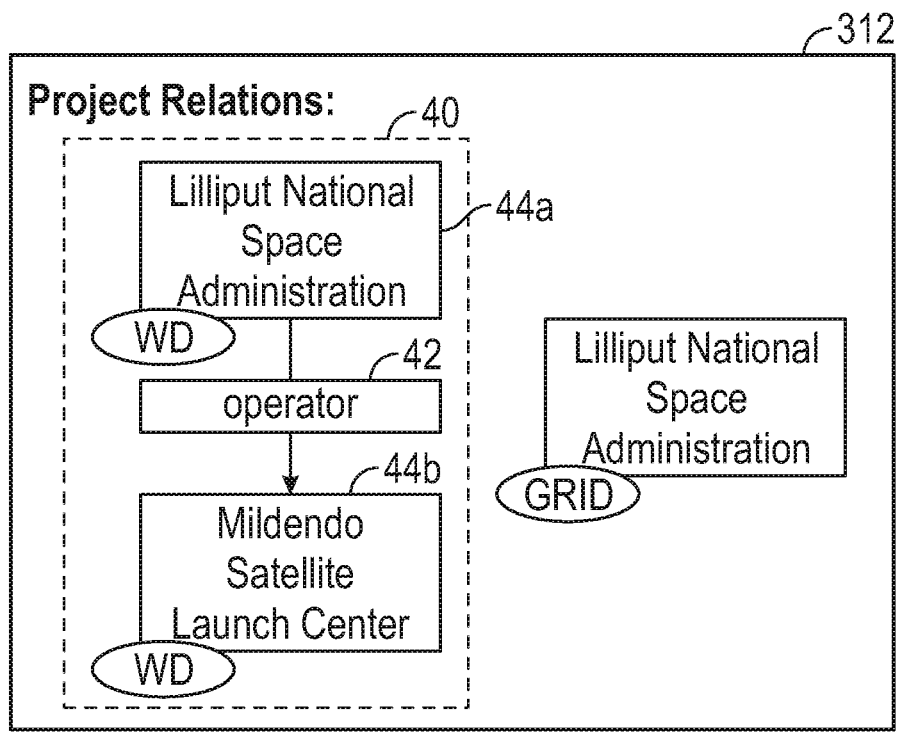

FIG. 8C depicts a new link screen 314, as can be displayed by embodiments in response to a user selection of two or more entities. New link screen 314 can enable the user to directly enter a datum 40 as a link between two entities. As depicted, the user can search for a relationship 42, and recommended relationship types can be generated or discovered based on the user's entry. In embodiments, recommended relationships can comprise properties, links, relationships, or other attributes defined in one or more structured data models, such as the WIKIDATA data model. FIG. 6D depicts the project relations screen 312 updated to indicate the user provided datum 40: <Lilliput National Space Administration, operator, Mildendo Satellite Launch Center>. This datum 40 can be stored by system 100 in a datum record 206 and an activity record 220 can be generated. The activity record can comprise an agent identifier 222 identifying the user, if user identification information (such as user name) is available, as well as information that can be used to identify the computing system hardware and software that was used. For example, the user agent can be identified by software version, web browser (for web-based clients), internet protocol address, hardware configuration, or any other available information regarding the user agent 304.

Figure 8E:
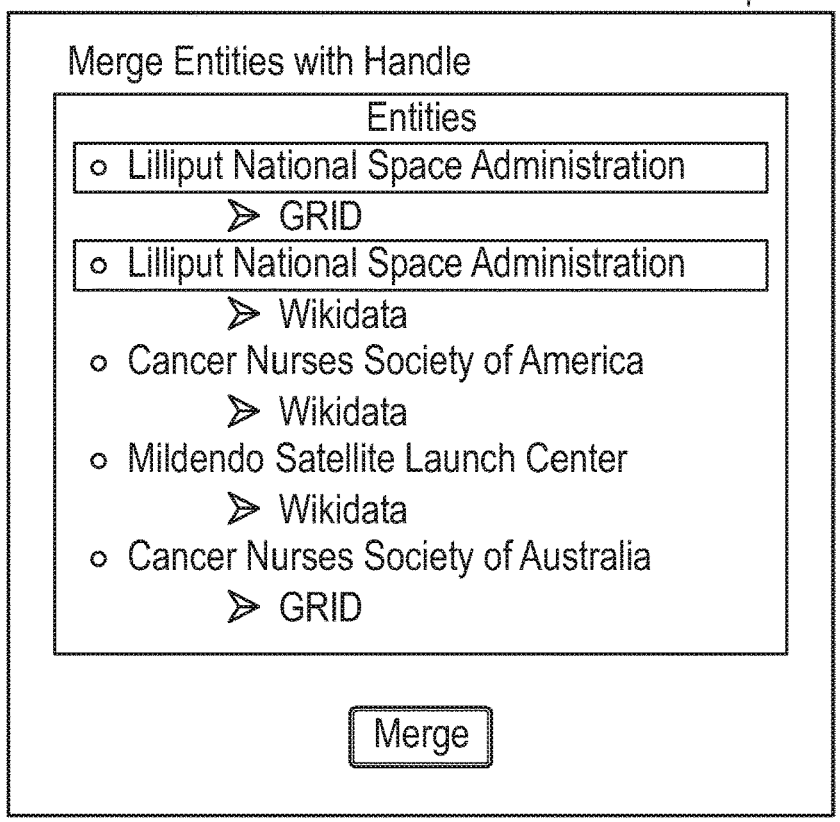
Figure 8F:
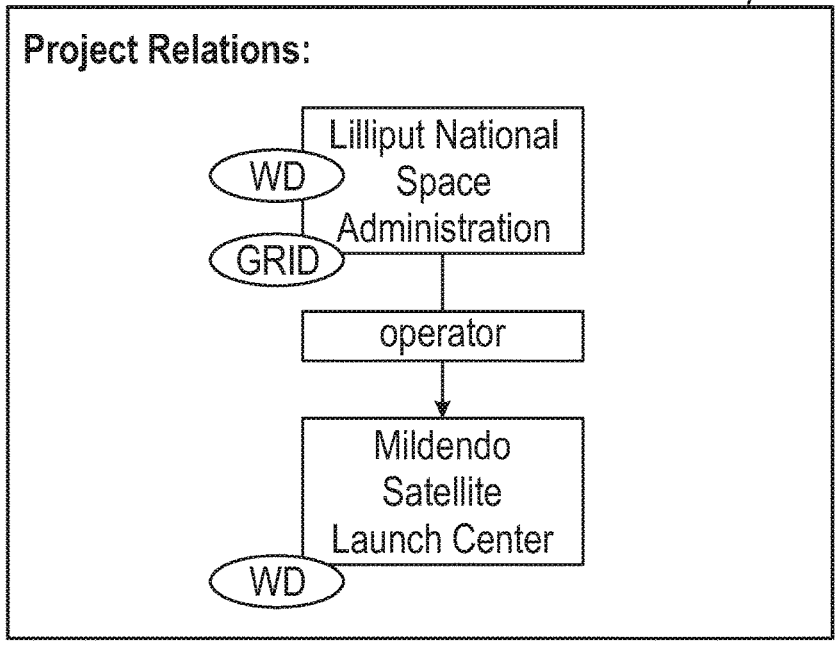

FIG. 8E is a merge entities screen 316, as can be displayed by embodiments in response to a user selection of two or more entities. Merge entities screen 316 can enable the user to create a handle datum to link two external data entries into a single entity 44. FIG. 8F depicts the project relations screen 312 updated to depict the link between the WIKIDATA and GRID source of the "Lilliput National Space Administration" entity. As such, information received from either data source regarding the entity can be stored in the single merged entity.

Figure 9:
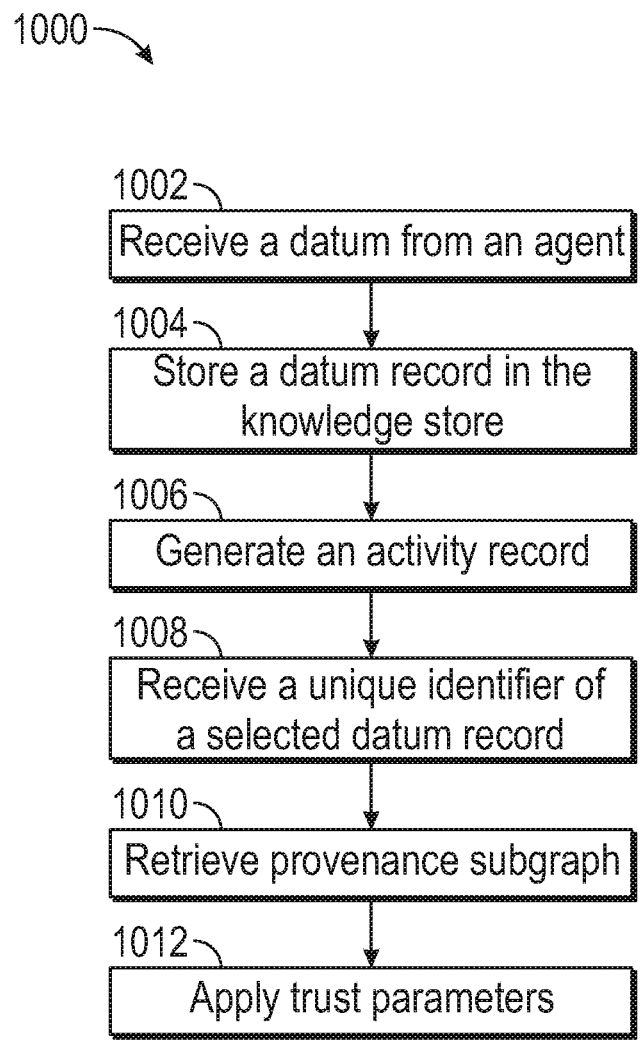
FIG. 9 is a flowchart depicting a method for retrieving a displaying the provenance of a datum, according to an embodiment.

FIG. 9 is a flowchart depicting a method 1000 for determining the provenance of any datum 40 stored in data store 200. At 1002, a datum can be received via agent interface 300 from an agent 302. At 1004, a datum record 206 can be generated and stored in knowledge store 202. In embodiments, knowledge store 202 can be searched to determine if an equivalent datum record 206 already exists, before creation of a new datum record 206. If a new datum record 206 is created, it can be linked, combined with, or otherwise associated with any preexisting datum records 206.

At 1006, an activity record 220 can be generated and stored as a link in provenance graph 240 within provenance store 204.

It should be recognized that 1002, 1004, and 1006 can be repeated multiple times as data is received from agents 302 prior to receiving a request for provenance of a selected datum record 206 at 1008. At 1010, the provenance subgraph 242 for the selected datum record 206 can be retrieved or generated, in further detail with respect to FIGS. 10 and 11 below.

At 1012, the provenance subgraph 242 can be augmented by applying any provided trust parameters. The provenance subgraph 242 can be provided for display via visualizer user interface 504.

Figure 10:
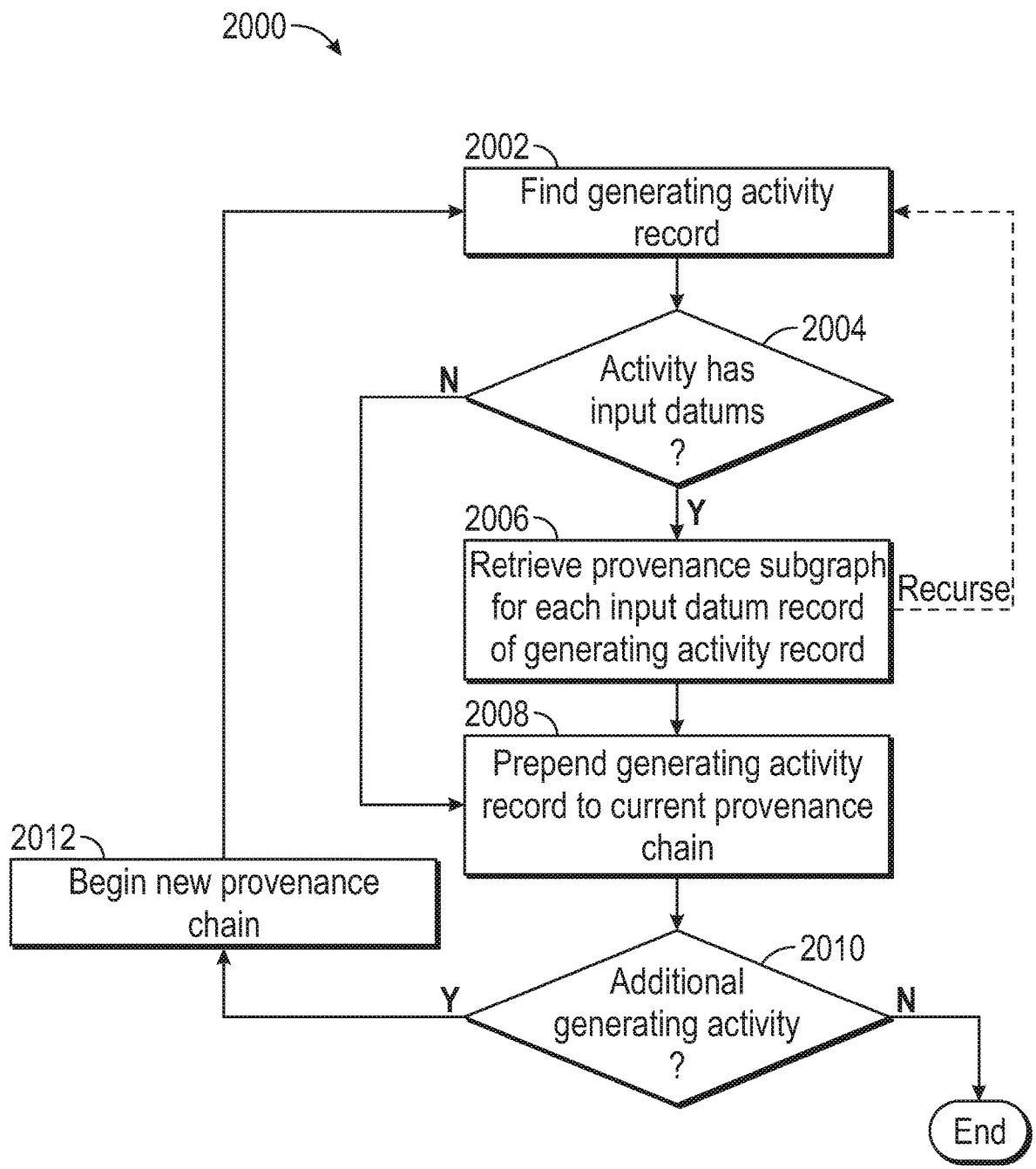
FIG. 10 is a flowchart depicting a method for retrieving a provenance subgraph, according to an embodiment.

FIG. 10 is a flowchart depicting a method 2000 for retrieving a provenance subgraph 242 for a selected datum 40 per 1010 as discussed with respect to FIG. 9 above, according to an embodiment. As discussed above with respect to FIG. 5, provenance subgraph 242 can be a set of provenance chains retrieved by traversal of a provenance graph 240. At 2002, a generating activity record of the selected datum 40 can be found. If, at 2004, the generating activity record has no input datum records, the current activity record is a leaf node, and can be prepended to the current provenance chains at 2008. If, at 2004, the generating activity record has input record, at 2006 the provenance subgraph 242 of each of the input datum records can be recursively generated and added to the retrieved provenance subgraph 242.

If, at 2010, additional generating activities of the selected datum 40 are discovered, a new provenance chain can be started at 2012, and processing can be iterated by beginning again at 2002. Otherwise, processing can end and the retrieved provenance subgraph can be returned.

Figure 11:
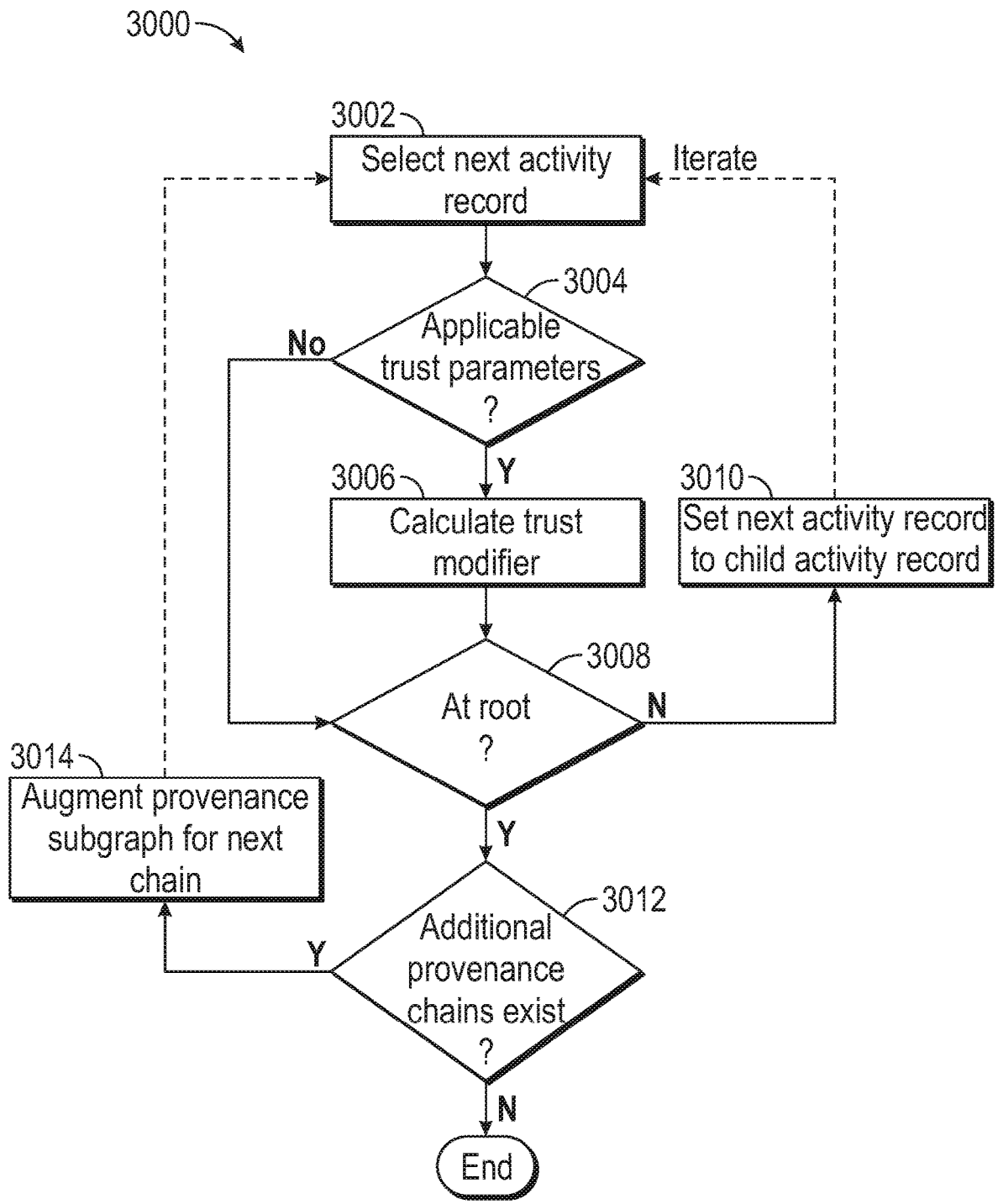
FIG. 11 is a flowchart depicting a method for augmenting a provenance subgraph, according to an embodiment.

FIG. 11 is a flowchart depicting a method 3000 for applying one or more trust parameters to a provenance subgraph 242 per 1012 as discussed with respect to FIG. 8 above. Each activity record 220 of provenance subgraph 242 can be augmented with a trust modifier 232. Trust modifier 232 can be calculated based on trust parameters received via attribution records 250, on-demand refutations, and/or trust modifiers 232 applied to any parent activity records in provenance subgraph 242. Method 3000 can comprise an iterative traversal of each provenance chain of provenance subgraph 242.

At 3002, an activity record can be selected. In embodiments, the selected activity record can be the first activity record in a chain of provenance subgraph 242. At 3004, applicable trust parameters can be determined. An applicable trust parameter can be an attribution record 250 providing an attribution 256 including a confidence in the source, class, or value of any of the input datum records of activity record 220. An applicable trust parameter can further be a temporary refutation of the agent, class of agent, operation, or class of operation, or the source of input datum record as could be received via visualizer user interface 504. Like attributions 256, temporary refutations can be total falsifications (such as a confidence value of zero), or partial falsifications (such as a confidence value of greater than zero).

At 3006, the trust modifier 232 of the activity record 220 can be calculated. Various mathematical methods can be used to calculate trust modifier 232. For example, a default trust modifier 232 can be 1, and the trust modifier 232 can be modified by multiplying the current trust modifier by confidence values from attribution records 250 and/or temporary refutations, which can each have, or be assigned, a value between 0 and 1. The calculated trust modifier 232 can be propagated to follow-on provenance records by being temporarily stored as a trust parameter, or by accessing the trust modifier 232 applied to a parent activity record when evaluating a child activity record.

At 3008, if the current activity record 220 is not at the root of a chain in provenance subgraph 242 (i.e., additional child activities remain), the next activity record 220 can be set to the next (child) activity record in the chain at 3010

If no additional activity records 220 remain in the current chain, the presence of additional chains can be determined at 3012. If additional chains exist, the provenance graph subgraph 242 for the next chain can be generated at 3014 by execution of method 3000 for the next chain. If no additional chains exist, execution can end.

Referring now to FIGS. 12-17, example provenance visualization screens 506, as might be displayed by embodiments of provenance visualizer user interface 504 are depicted. In embodiments, provenance subgraph retriever 502 can generate or retrieve provenance subgraph 242 for a datum 40. The retrieved graph or subgraph can be received by provenance visualizer user interface 504 for display. In embodiments, as additional activities are performed by agents 302, updates to the relevant provenance subgraph 242 can be automatically provided to visualizer user interface 504. For example, if an additional inference activity, based on a different datum or set of datums results in datum 40, provenance subgraph 242 can be updated to include the updated provenance chain and provenance visualization screen 504 can be updated automatically.

In the example screens proved, Agents 302 are depicted by empty right-facing triangle symbols, external data sources 402 are depicted by empty circles, datum records 206 are depicted by empty rectangles. Activities are depicted by dot-filled right-facing triangles, handles are depicted by upward facing arrows, qualifiers are depicted by division signs, conflicts are depicted by not-equal signs, links are depicted by solid rectangles, and beliefs are depicted by downward pointing flags. Similar symbols are depicted in other example visualization screens depicted herein. The various embodiments of the present disclosure can use the same, similar, or alternate sets of icons, symbols, colors, animations, movements, sounds, or other ways to depict and differentiate the various data record types depicted.

Figure 12:
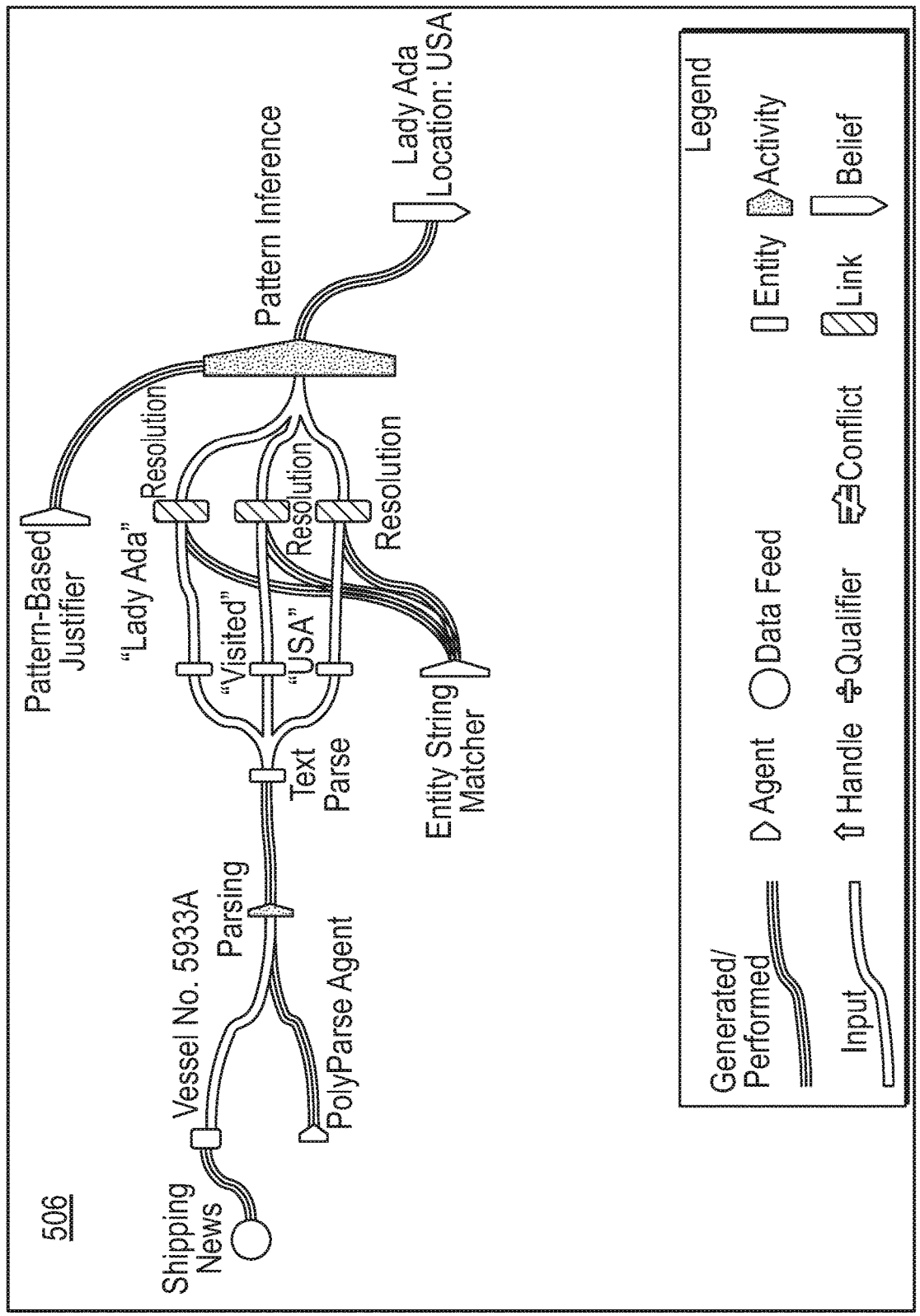
FIGS. 12-17 are mockups depicting example screens of a visualizer user interface, according to an embodiment.

In the example screen depicted in FIG. 12, the provenance of a belief that a vessel known as the Lady Ada is currently located in the United States is shown. Reading from right to left, a pattern inference activity was performed by a pattern-based justifier agent to generate the belief. The activity used three resolved strings, "Lady Ada," "visited," and "USA" to generate the belief. Each of the resolved strings was generated by an entity string matcher agent, based on strings generated by a parsing activity performed by a polyparse agent, that processed a document titled "Vessel No. 5933A" published by a "Shipping News" external data source. In the depicted example, the entity string matcher agent may have been previously configured to identify strings that might apply to entities of interest.

Figure 13:
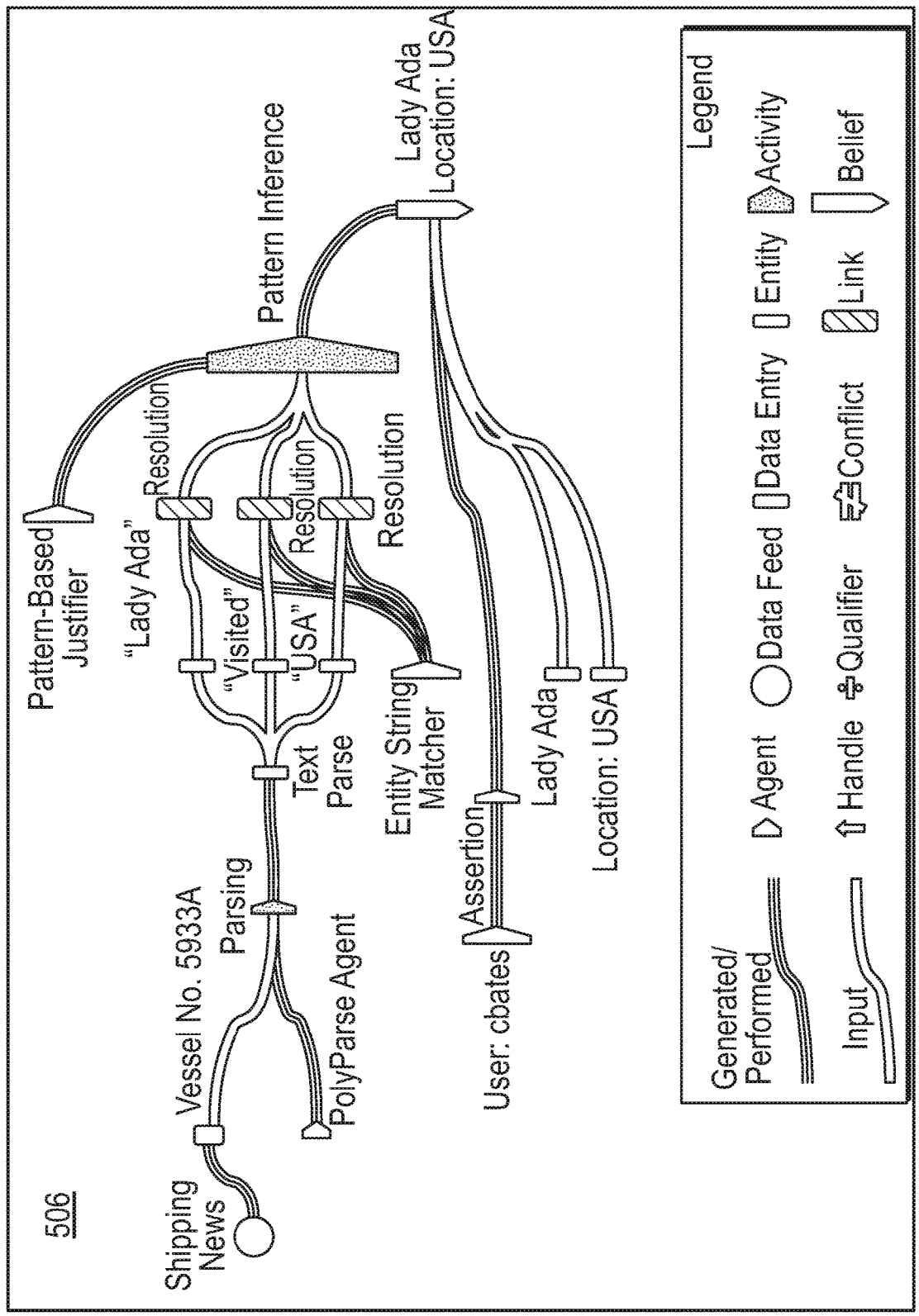

FIG. 13 is an alternate provenance visualization screen 506, in which a second path of datum records provides support for the belief that the Lady Ada is in the United States. Here, a user agent 304, with an identifier of "cbates" has made an assertion that the Lady Ada is in the United. States. This assertion aligns with the belief generated by the software agents.

Figure 14:
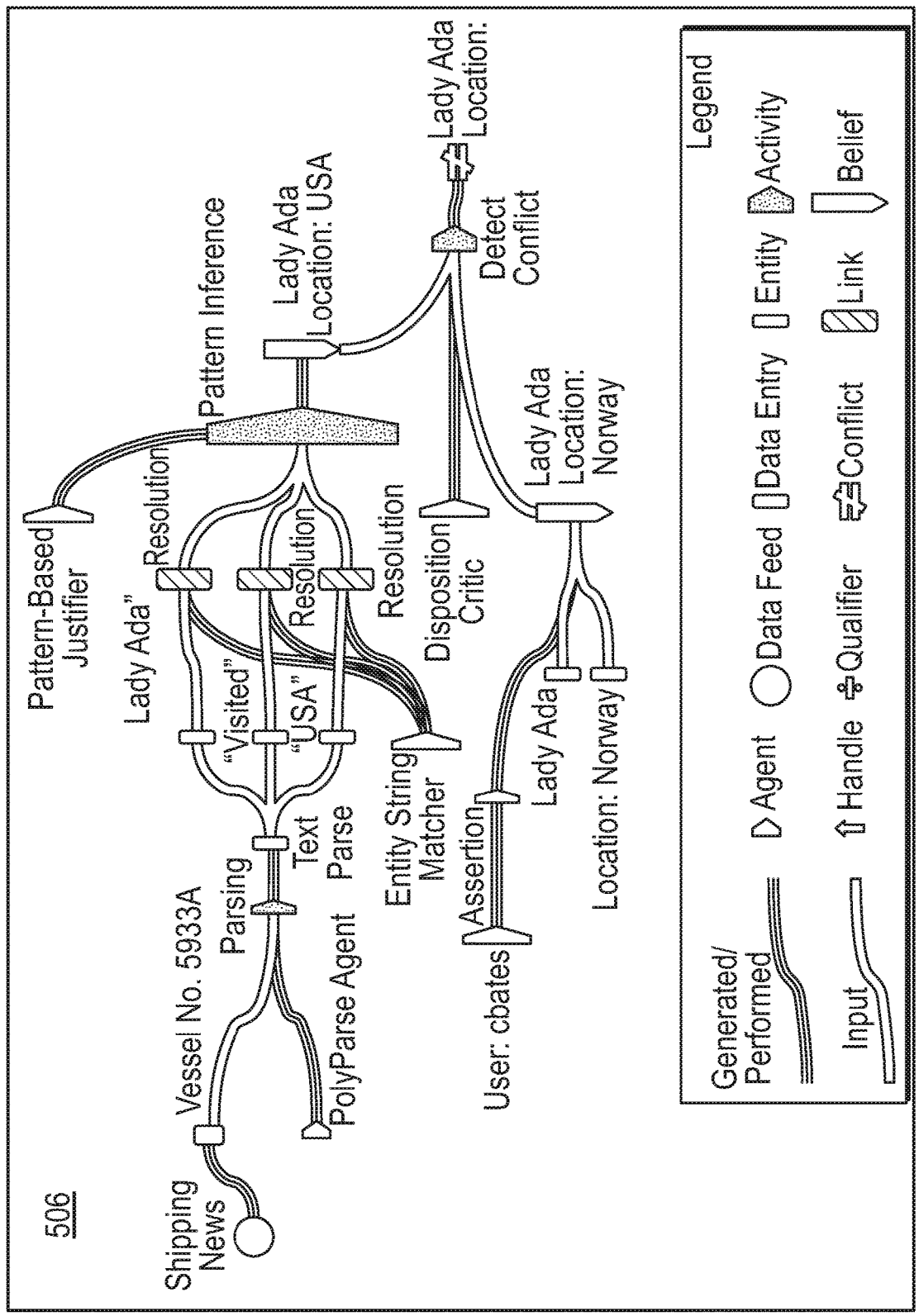

FIG. 14 is an alternate provenance visualization screen 506, in which user thaws has made an assertion that the Lady Ada is in Norway. A disposition critic agent is depicted as performing a detect conflict operation to create a conflict datum based on the location of the Lady Ada. Various techniques of resolving the conflict that are enabled by system 100 are depicted in FIGS. 15-17.

Figure 15:
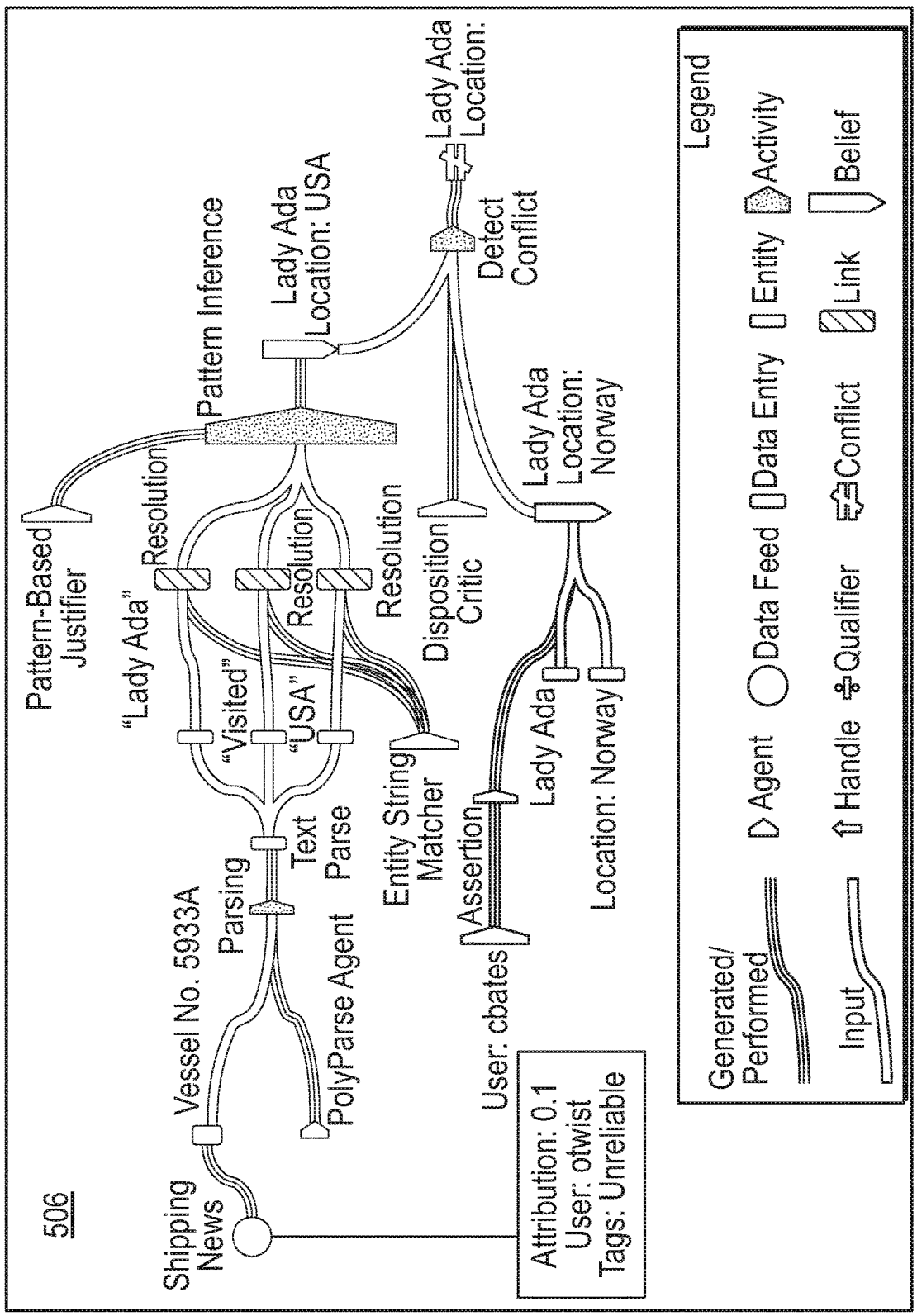

In FIG. 15, a user with ID "otwist" has created an attribution record associated with the Shipping News external data source. The screen is updated to show that not only is the Shipping News considered unreliable (with an attribution 256 including an Intelligence Community Directive (ICD) 203 analytic standards numerical confidence of 0.1), but the belief generated by it (and the conflict with the other belief) are also shown in grey to indicate the reduced level of trust in the Lady Ada location: USA belief.

Figure 16:
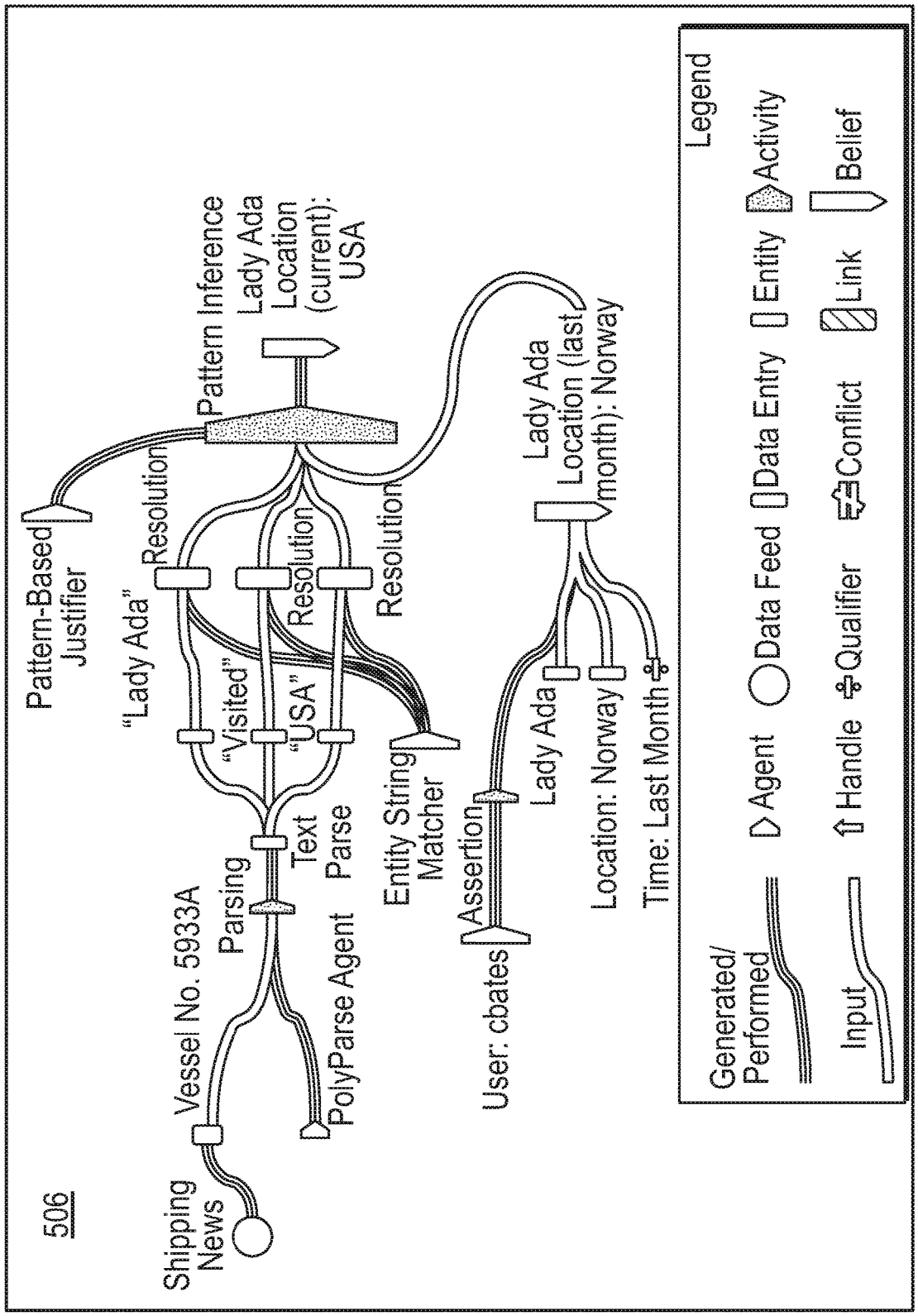

In FIG. 16, the user "cbates" has qualified the assertion first shown in FIG. 15, to indicate that the Lady Ada was seen in Norway "last month." This time-based qualifier enables the pattern-based justifier to generate a qualified datum: the Lady Ada is currently in the USA.

Figure 17:
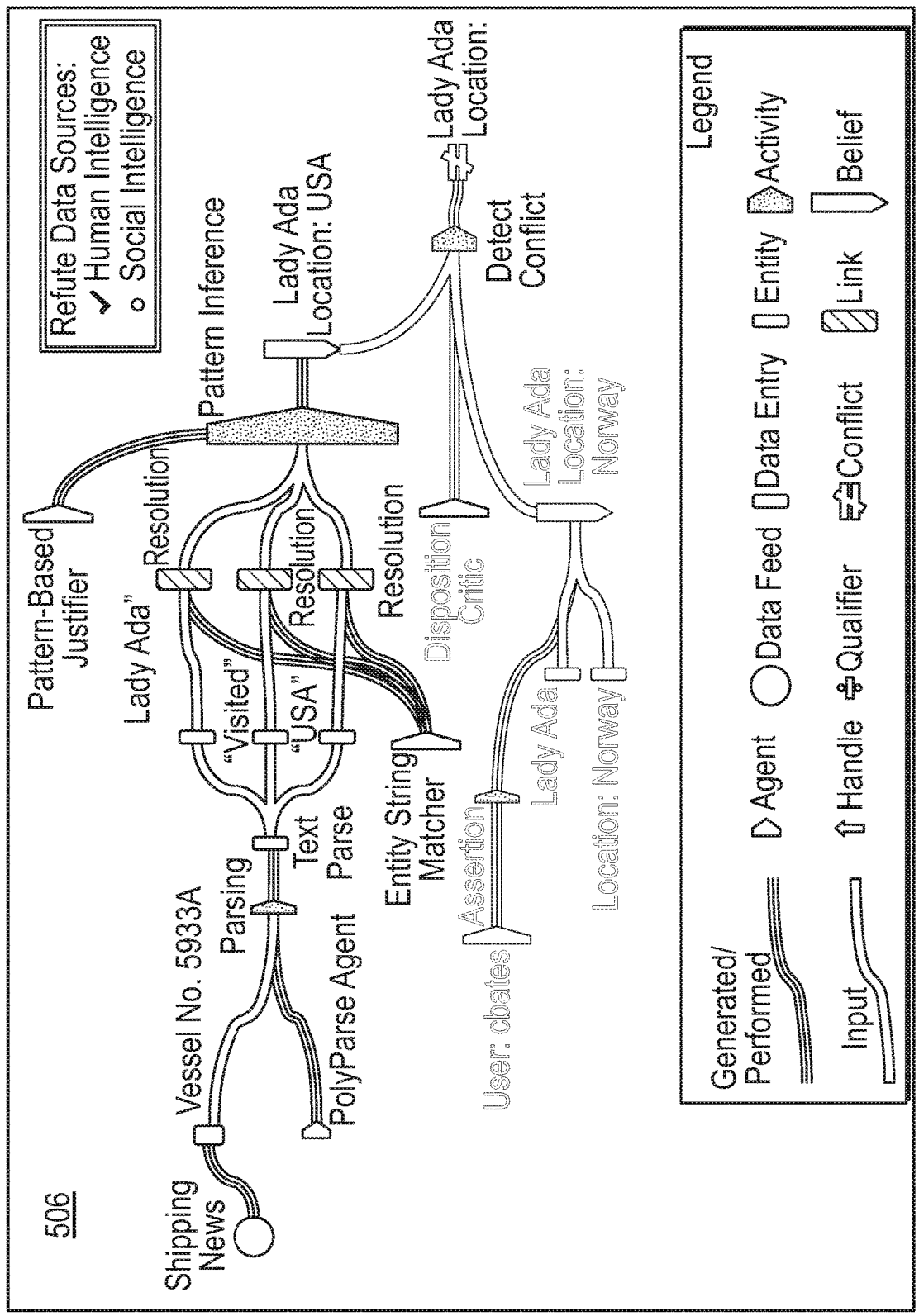

In FIG. 17, the class of human intelligence data sources (including user agents 304) has been temporarily refuted by the user. Provenance visualization screen 506 is updated to indicate that no conflict currently exists. System 100 can support temporary refutations and attribution records including total falsifications (for example, an assumption that all datums provided by "parsing" operations are incorrect), or partial falsifications (for example providing a confidence value of 0.5 for all datums provided by agents using neural networks, or using models trained based on a specific input dataset).

Figure 18:
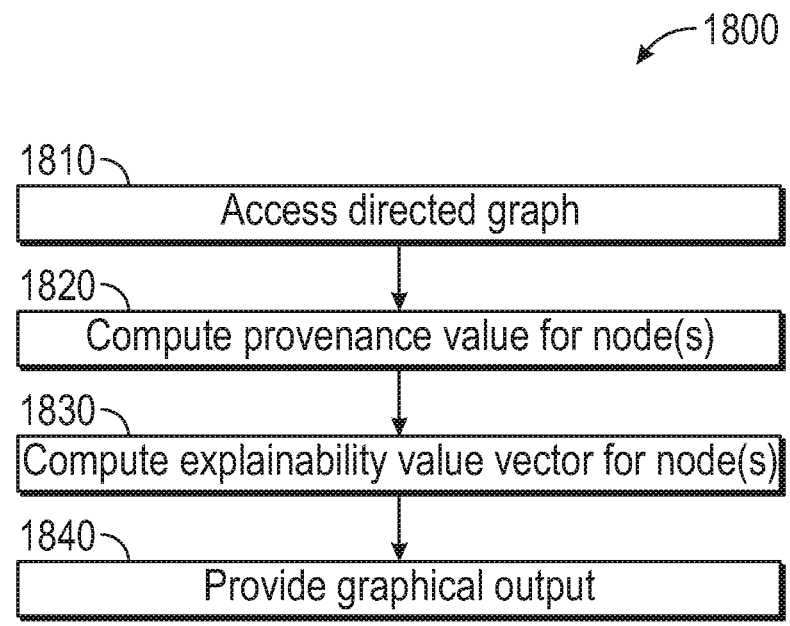
FIG. 18 is a flow chart illustrating a method for computerized plan analysis, according to an embodiment.

FIG. 18 is a flow chart illustrating a method 1800 for computerized plan analysis, according to an embodiment. The method 1800 may be implemented using computing machine(s) (e.g., the computing machine 2600 illustrated in FIG. 26).

At operation 1810, the computing machine(s) access, in a graph data repository coupled with the computing machine(s), a directed graph data structure representing one or more sequences of actions. The directed graph data structure comprises nodes and edges between the nodes. Each node is either a beginning node, an intermediate node, or an end node. Each intermediate node is downstream from at least one beginning node and upstream from at least one end node. Each beginning node in at least a subset of the beginning nodes has an explainability value vector.

In some cases, each node in the directed graph data structure represents an entity, an activity or an agent. The directed graph data structure may comprise a tripartite dependency graph.

At least one beginning node may represent an information source or a data feed. At least one intermediate node or at least one end node may represent an action to perform, evidence, a belief or a hypothesis. At least one end node may represent a goal or an expected result.

At operation 1820, the computing machine(s) compute for each first node from among a plurality of first nodes that are intermediate nodes or end nodes, a provenance value representing dependency of an explainability value vector of the first node on the one or more nodes upstream from the first node.

At operation 1830, the computing machine(s) compute, for each first node, the explainability value vector. The explainability value vector for the first node is a computational combination (using one or more of maximum, minimum, Bayesian combination, and the like) of explainability value vectors of one or more nodes upstream from the first node. The computational combination of explainability value vectors is computed by propagating, within the directed graph data structure, values from the explainability value vectors of the one or more nodes upstream from the first node. The explainability value vector may include one or more of: an assumption value, a categorical value, a confidence value, a bias value, a risk value, a likelihood of success value, and a potential reward value.

As used herein, the term "upstream" encompasses its plain and ordinary meaning. In a directed graph, Node A is considered upstream of Node B if Node A is traversed before Node B in traversing the directed graph according to its direction.

The explainability value vector may represent one or more of: reliability of information, information source(s), sensor(s) or actor(s) on which information is based, how much or how far certain beliefs influenced the plan, assumptions on which the plan is based, and why something was included in the plan.

As shown, the operation 1820 is completed before the operation 1830. However, in some embodiments, the operation 1830 is completed before the operation 1820. In some cases, the user may refute one of the nodes (e.g., via a graphical user interface coupled with the computing machine(s)), and the provenance value or the explainability value vector may be recomputed based on the user's refutation.

At operation 1840, the computing machine(s) provide a graphical output representing at least an explainability value vector of an end node. The graphical output may comprise a graphical representation of the directed graph data structure. The graphical output may indicate the explainability value and the provenance value of each first node from among the plurality of first nodes. Some non-limiting examples of the graphical output (which may be provided in operation 1840) are shown in FIGS. 20-25 and described below. The graphical output may be provided, by the computing machine(s), using a display unit (e.g., a screen or a monitor) coupled with the computing machine(s).

In FIG. 18, the operations of the method 1800 are described as being performed serially in a given order. However, these operations may be performed in any order, not necessarily in the order specified. In some embodiments, two or more of the operations may be performed in parallel.

In some cases, the computing machine(s) adjust the graphical representation for display via a graphical user interface (GUI) at a display device. The computing machine(s) may provide for display on the display device, a scroll bar and a scroll thumb for scrolling through the graphical representation, the scroll bar being operable to move through the graphical representation by manipulating the scroll thumb using the GUI.

In some cases, the computing machine(s) receive a selection of a node. The computing machine(s) generate, for the selected node, a natural language sentence corresponding to the explainability value vector of the selected node or the provenance value of the selected node. The computing machine(s) adjust, for one or more first nodes from among a plurality of first nodes, the explainability value vector based on the provenance value of the one or more first nodes and the adjusted explainability value vector of the at least one node. The one or more first nodes are different from the at least one node. The natural language sentence may be generated by automatically populating fields of natural language templates based on values from the explainability value vector.

In some cases, the computing machine(s) receive an input for adjusting an explainability value vector of at least one node from the directed graph data structure or removing a node from the directed graph data structure. The computing machine(s) adjust, for one or more first nodes from among a plurality of first nodes, the explainability value vector based on the provenance value of the one or more first nodes and the adjusted explainability value vector of the at least one node. The one or more first nodes are different from the at least one node.

According to some embodiments, the computing machine(s) propagate multiple dimensions of statistical explainability values throughout a potentially dense and broad network of nodes, combining some of these explainability values at junctions.

In one example, the beginning nodes include: (i) the Weather Channel reporting that tomorrow will be rainy, and (ii) Anne says tomorrow will be rainy and 20 C. The Weather Channel may have a reliability value of 90% for weather reports, and Anne may have a reliability value of 60% for weather reports. The intermediate node "it will be rainy," may have a reliability value of the maximum of 90% and 60%, which is 90%. The intermediate node "it will be 20 C," may have a reliability value of 60%, which is equal to Anne's reliability value (as, in the above example, there is no temperature in the Weather Channel's data).

Some real-world automated planning domains involve diverse information sources, external entities, and variable-reliability human and machine agents, all of which may impact the confidence, risk, and sensitivity of plans. Humans reviewing a plan may lack context about these factors. However, this information is available during the domain generation, which means it can also be interwoven into the automated planner and its resulting plans. Some embodiments present a provenance-based approach to explaining automated plans. At least one approach (1) extends a planning scheme to generate dependency information, (2) transforms the dependency information into an established PROV-O representation, and (3) uses graph propagation and TMS-inspired algorithms to support dynamic and counterfactual assessment of information flow, confidence, and support. Some aspects qualified the approach's explanatory scope with respect to explanation targets from automated planning and information analysis, and some aspects demonstrate its ability to assess the pertinence, sensitivity, risk, assumption support, impact, diversity, and relative confidence of any element of a plan or of the entire plan itself. As used herein, the term "domain" may include a planning model that includes information about the actions and entities available to the planner. The domain may include the expected effects of executing each action.

In complex, dynamic, and uncertain environments, it is useful if human operators understand machine-generated plans, including their sensitivity to world changes, their reliance on individual actors, their diversity of information sources, their core assumptions, and how risky they are.

Some embodiments are directed to, among other things, an approach to dynamically explain and explore machine-generated single- or multi-agent, single- or multi-goal plans using provenance-based analysis and visualization strategies.

Some explainable automated planning schemes focus on inspecting algorithms (i.e., explicating the decision-making process), synchronizing mental models (e.g., because the user views the problem differently than the planner), and improving usability (e.g., making complex plans more interpretable) and assumed fixed background domain knowledge. In contrast, the provenance-based approach treats the plan as a tripartite dependency graph that helps explain the foundations, reliability, impact, and sensitivity of the information that comprises the plan's states and actions.

Figure 19:
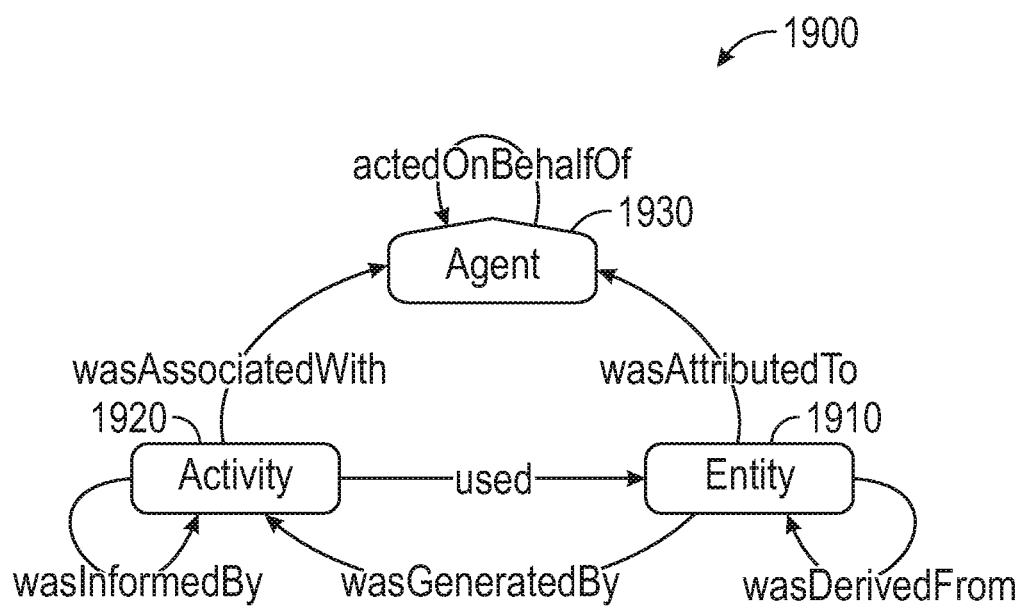
FIG. 19 illustrates entities included in a data model, according to an embodiment.

The term "provenance" may encompass its plain and ordinary meaning, and may include "information about entities, activities, and people involved in producing a piece of data or thing, which can be used to form assessments about its quality, reliability or trustworthiness." Some aspects describe the formal provenance data model (PROV-DM) relationships among these elements later, as shown in FIG. 19. Some aspects augment the Hierarchical Task Network (HTN) planner SHOP3 with the ability to annotate its plans with provenance by recording, on the fly, (1) causal dependencies, (2) dependencies from plan components onto aspects of the model (domain) from which they derive, and (3) sources of information used by the planner in checking preconditions and deriving beliefs.

The provenance of the SHOP3 plan feeds into downstream provenance analysis, which uses PROV-DM to represent beliefs, planned activities, and actors, and an ontology to represent assumptions, confidence, and likelihood of those PROV-DM elements. One approach combines truth maintenance and provenance propagation to estimate the confidence in the correctness of planned actions, and counterfactually assess the sensitivity of the plan to the presence or the absence of various data sources, actors, events, and beliefs.

One claim is that tracking and analyzing a plan's provenance can improve the interpretation of plans—along dimensions of confidence, information dependency, risk, impact, and sensitivity—without reducing the efficiency of the planner or the complexity of the search space. To support this claim, the provenance is displayed interactively within a provenance visualization environment. This provenance-based approach is especially useful for explaining plans with multiple goals and for plans with multiple actions to achieve a given goal. While the demonstration uses provenance analysis after planning completes, some aspects identify future avenues for using provenance within a planner to advise search heuristics, mixed-initiative planning, contingency planning, and re-planning.

Some aspects utilize the PROV-O ontology, which expresses PROV Data Model's entities and relationships using the OWL2 Web Ontology Language. The primary relationships over the classes in PROV are shown in FIG. 19, as detailed in the W3C PROV-O recommendation.

As shown in FIG. 19, the PROV Data Model 1900 includes the following three primary classes of elements to express provenance: (1) Entities 1910 are real or hypothetical things with some fixed aspects in physical or conceptual space. These may be beliefs, documents, databases, inferences, etc. (2) Activities 1920 occur over a period of time, processing and/or generating entities. These may be inference actions, judgment actions, planned (not yet performed) actions, etc. (3) Agents 1930 are responsible for performing activities or generating entities. These may be humans, machines, rovers, web services, etc.

The DIVE ontology extends the PROV ontology with additional classes and relationships to appraise information and validate information workflows. Some aspects use DIVE's Appraisal class, which represents an Agent's 1930 judgment about an activity 1920, entity 1910, or other agent 1930.

One embodiment expresses a DIVE Appraisal about a GPS sensor—from which a machine may derive beliefs about the world before planning and during plan execution—with moderate baseline confidence. This baseline confidence in the GPS sensor may affect the confidence of the information it emits, all else being equal, which may ultimately impact the judgment of the success likelihood of the planned actions.

Some embodiments also use DIVE to express collection disciplines such as GEOINT (geospatial), IMINT (image), and other types of information for relevant information sources, beliefs, and sensors involved in a plan. DIVE is expressed at the metalevel of PROV. DIVE expressions flow through the network to facilitate downstream quality judgments and interpretation.

Figure 20:
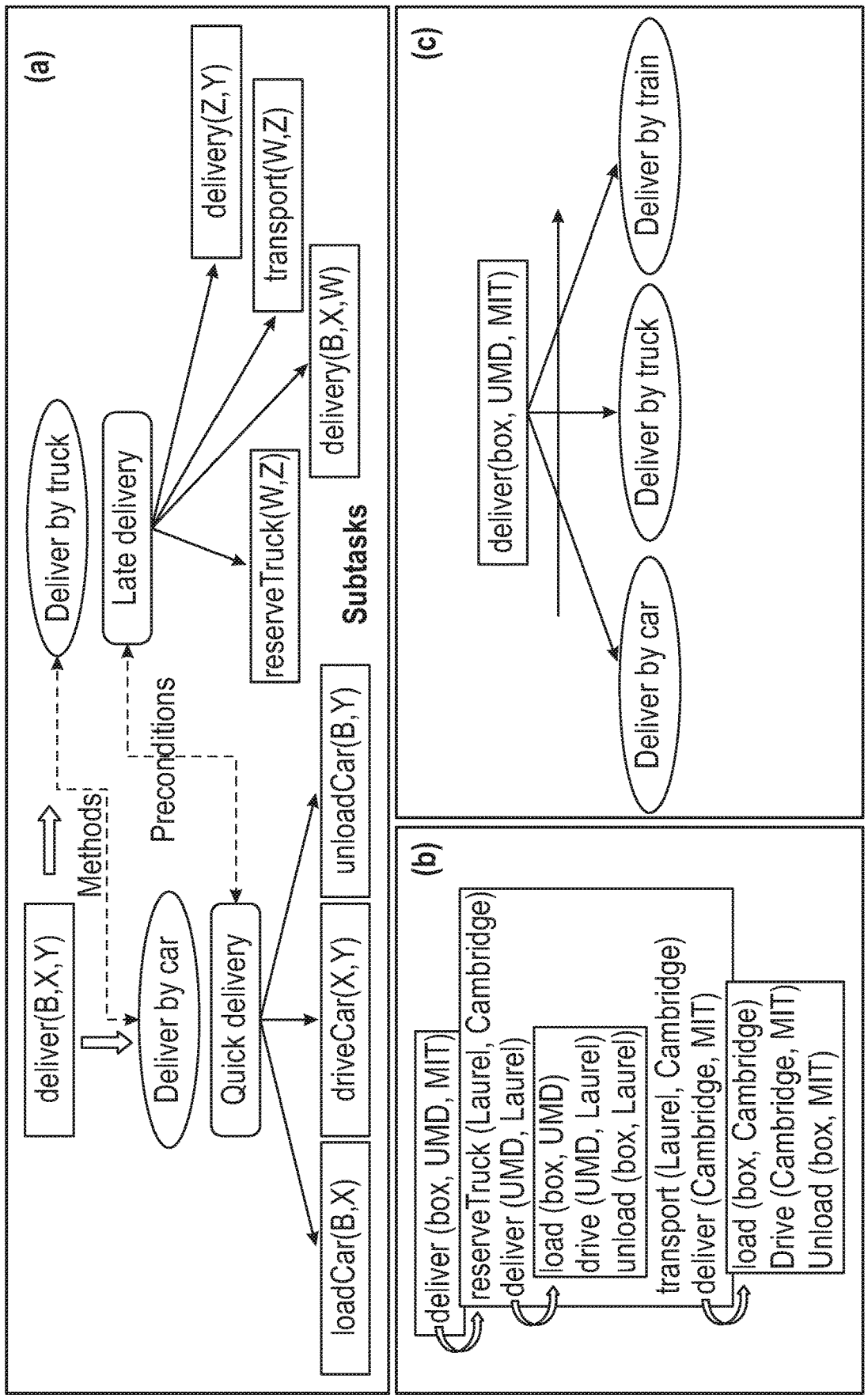
FIG. 20 illustrates an example of domains being described and used for planning in a delivery planning example, according to an embodiment.

SHOP3 is a HTN planner. Unlike a first principles planner, an HTN planner produces a sequence of actions that perform some activity or task, instead of finding a path to a goal state. An HTN planning domain includes a set of planning operators (actions) and methods, each of which is a prescription for how to decompose a task into its subtasks (smaller tasks). The description of a planning problem contains an initial state as in classical planning. Instead of a goal formula, however, there is a partially-ordered set of tasks to accomplish. Planning proceeds by decomposing tasks recursively into subtasks, until primitive tasks, which can be performed directly using the planning operators, are reached. For each task, the planner chooses an applicable method, instantiates it to decompose the task into subtasks, and then chooses and instantiates other methods to decompose the subtasks even further. If the constraints on the subtasks or the interactions among them prevent the plan from being feasible, the planner will backtrack and try other methods. FIG. 20 illustrates an example of SHOP3 HTN domains being described and used for planning in a delivery planning example.

SHOP3 is an HTN planner that generates actions in the order they will be executed in the world (hence "hierarchical ordered planner" in the name). Example use cases for SHOP3 may include one or more of: Air Operations and UAV planning, cyber security, cyber-physical systems, planning for synthetic biology experiments, and other things. SHOP3 may implement a modernized codebase, extendibility (e.g. with plan repair capabilities, new input languages, etc.), and a search engine. It should be noted that, according to some embodiments, the order of methods in a SHOP domain description may specify a user preference.

Some aspects describe how we extended the SHOP3 planner to emit dependency information to support provenance. Some aspects describe our approach with respect to relevant questions and information analysis that have been proposed as primary targets for integrity and explainability. Some aspects describe relevant representations and algorithms in the approach as they apply to these questions.

Some embodiments may include augmenting SHOP3 so that, when planning, it builds a plan tree that has dependency information (causal links). These links allow the plan repair system to identify the minimally compromised subtree of the plan, as a way to provide stable, minimal-perturbation plan repairs. This extension provides much of the provenance information that we need for explainability, because it allows the machine to trace the choice of methods and primitive actions back to other choices that enabled them. Some embodiments extend the scope and semantics of these links to (1) trace decisions back to the model components that justify them and (2) trace preconditions back to actions that establish them and information sources that provided them.

In tracing decisions back to model components, the SHOP3 planner takes as input domain and problem data structures, and the domain data structures contain the model components, specifically the primitive operator and method definitions. For the moment, we do not track the provenance of components of the planner's model. However, since the domain descriptions are typically maintained in a revision control system, such as subversion or git, it may be useful to extend our provenance tracing back to the person or persons who wrote these model components. For a more sophisticated development environment, one could imagine a traceback that reaches into an integrated development environment or a machine learning system.

Tracing decisions back to information sources may be complex. In the base case, a proposition is established in the problem data structure—that is, in the initial state. In a larger system that incorporates the SHOP3 planner, there may be a component that builds these problem data structures. For example, in a robot planning system, some aspects may have a component that builds problems programmatically from user input (tasks to achieve) and some source of external information (e.g., a map database, telemetry from robotic platforms, etc.). These components can annotate the initial state (and potentially the tasks SHOP3 is asked to plan) with provenance information, using PROV-DM in a way that is appropriate to the application domain. This provenance information can then be propagated through the causal links in the plan tree.

In some cases, in the interests of modeling efficiency and expressivity, the SHOP3 planner may incorporate a theorem-prover—a backward-chaining engine. This is useful because the expressive power is not limited to propositional logic, the way most planners are: it permits state axioms, and non-finite domains of quantification. Thus, some preconditions may be established not just causally, but inferentially, through axiom deduction. Accordingly, some aspects extend the theorem-prover so that it also provides traceability. Provenance annotations that traced provenance through axioms back to actions that established antecedents for the axioms were already in place for plan repair. These may now be automatically incorporated information source provenance, as well as causal provenance.

Figure 21:
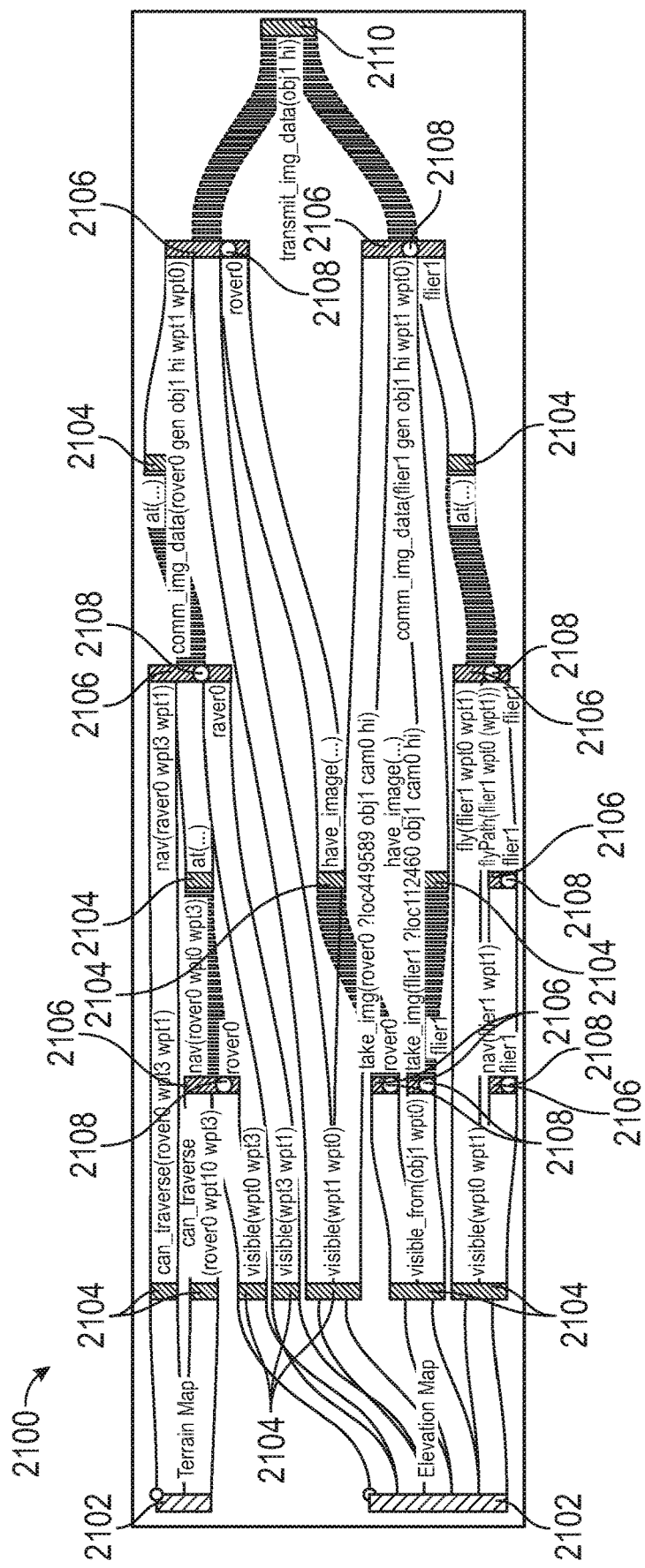
FIG. 21 illustrates an example graphical representation of a provenance-based plan, according to an embodiment.

FIG. 21 illustrates an example graphical representation 2100 of a provenance-based plan. As shown, the provenance-based plan includes information sources 2102, beliefs 2104, tasks 2106, agents 2108, and a goal 2110.

Some embodiments convert the extended SHOP3 plans into the data model, using the PROV-O ontology to represent the elements and relationships between them. FIG. 21 illustrates the SHOP-to-PROF mapping in a screenshot of the system displaying SHOP3 planner output. The plan content in FIG. 21 displays a single goal (at right) to transmit image data of objective) in high-resolution, and this goal is supported by two paths of tasks, performed by two separate agents (the aerial unit flier1 and the land unit rover0), with foundational beliefs derived from a Terrain Map and an Elevation Map.

Some aspects use the following mapping, Planned Tasks are specializations of prov:Activity. Unlike traditional uses of provenance for tracking past events, the PROV Activities from the plan may not yet have occurred—or may never actually occur. Plan Actors are specializations of prov: Agent. They are the performers of the PROV Activities, related via prov:wasAssociatedWith, as described in conjunction with FIG. 19. Plan Beliefs are specializations of prov:Entity. They support tasks with prov:used and they are realized by tasks with prov:wasGeneratedBy. Information Sources are specializations of prov:Entity. They represent sensors and repositories that emit information to derive beliefs and measurements used in the plan, and support beliefs via prov:wasDerivedFrom.

As shown in FIG. 21 the resulting provenance graph 2100 incorporates the information sources 2102 with the goals 2110 of the plan. The resulting provenance graph also incorporates the dependency network between the information sources 2102 and the goals 2110 of the plan. FIG. 21 may correspond to a screenshot.

In FIG. 21, information sources 2102, modeled as PROV entities, are sensors and repositories that support beliefs about the world and the initial state. Beliefs 2104, modeled as PROV entities, describe effects as preconditions for tasks. Tasks 2106, modeled as PROV activities, are primitive or complex actions. Agents 2108, modeled as PROV agents, perform tasks. The goal 2110 is supported by a disjunction of two paths. Source-to-belief links are modeled with AND-like PROV:wasDerivedFrom relations. Belief-to-task and task-to-task links are modeled with AND-like PROV:used relations. Task-to-belief links are modeled with OR-like PROV:wasGeneratedBy relations.

Given a plan to assess, the provenance system may automatically identify and catalog the following dimensions of the plan. These are displayed for user assessment and dynamic interaction, as shown in FIG. 22.

Figure 22:
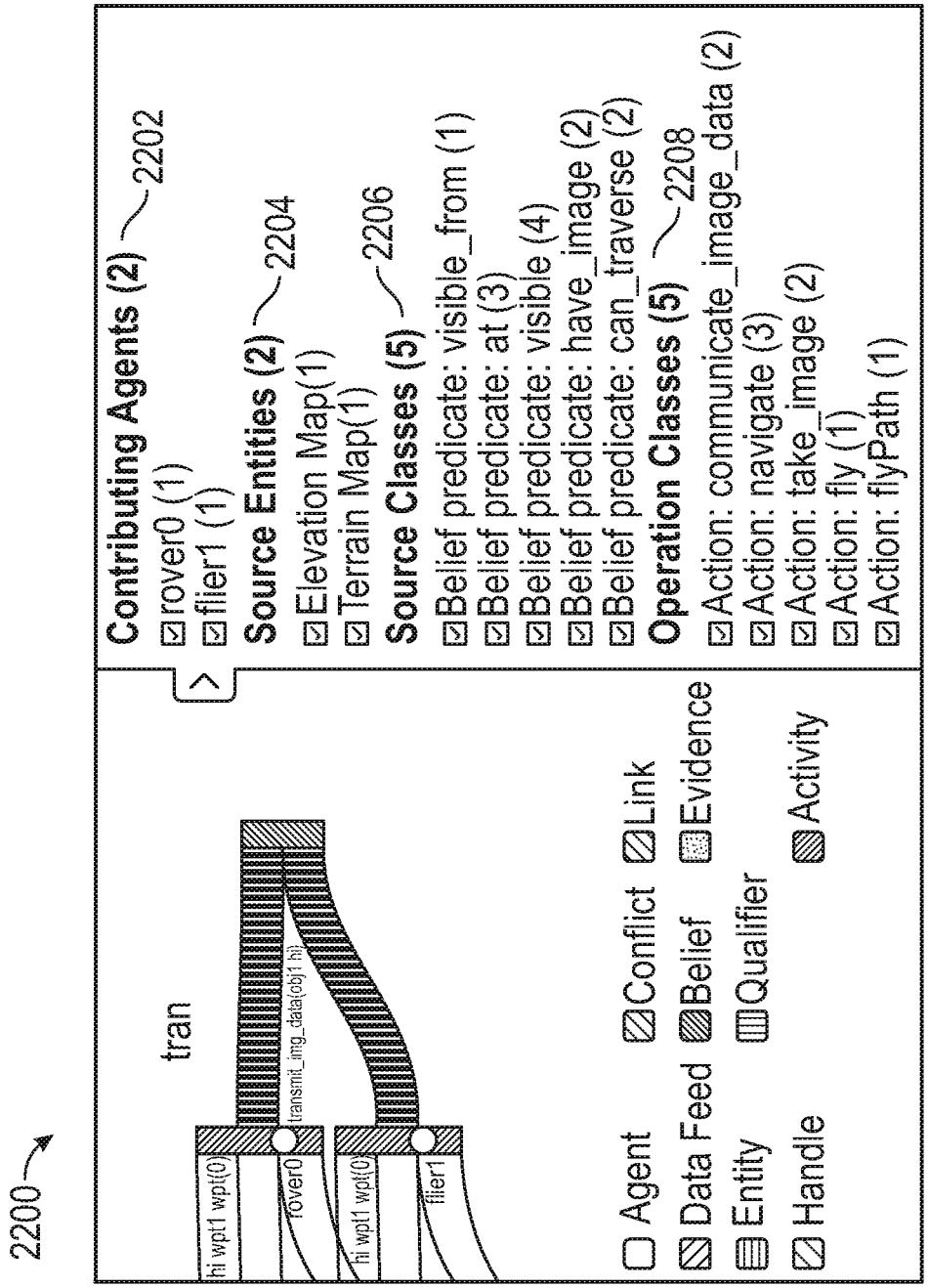
FIG. 22 illustrates identification and cataloging of some dimensions of a plan, according to an embodiment.

FIG. 22 illustrates a graph 2200 identifying and cataloging of some dimensions of a plan. Contributing agents 2202 are actors in the plan. Source entities 2204 are individual devices or informational resources from which plan-relevant beliefs are derived, such as geolocation, visibility, inventory, and more. Source classes 2206 are general categories of information across beliefs and information sources. These may include information sources or belief predicates. Operation classes 2208 are general categories of activities, spanning potentially many planned activities. The graph 2200 catalogs classes of actions. Cataloging plan nodes along these dimensions allows some embodiments to automatically identify, emphasize, or refute nodes along these dimensions to support explanation. These elements are identified by mining the predicates and sources of the plan. However, these elements could also be informed by the planner's model.

Some aspects use an engine similar to assumption-based truth-maintenance and explanation-maintenance systems to compute the environment of all nodes (i.e., planned action or belief) in the provenance graph. The engine traverses backward exactly once from all sink nodes, so it reaches each node m in the provenance graph and computes its environment $E(m)=\{S_1, \ldots, S_n\}$, a disjunction of sets ($S_i$) of assumptions, where any $S_i \in E(m)$ is sufficient to derive (i.e., believe, achieve, or enact) in, and where the assumptions correspond to root nodes in the provenance graph. The engine attends to the AND- and OR-like links listed in FIG. 21 to properly encode disjunctive derivation trees. This compact index answers questions of necessity and sufficiency in constant time.

The joint indexing of plan nodes by the four above dimensions and by their environments allows the provenance analysis system to identify abstract classes of sources and operations that contribute to it, and to which it contributes. Some aspects leverage these indices to help explain the plan in context, as described below.

The visualization environment is a graphical display within a larger engine (e.g., desktop, mobile or web-based platform) for human-machine collaborative intelligence analysis. At any time, the user may select one or more elements from diagrams or listings and peruse its full provenance.

An engine (e.g., a web service or other hardware or software architecture) traverses the knowledge graph to retrieve the full provenance for the desired belief(s) and all relevant appraisals, and then sends it to the client. The client's provenance visualizer may use D3.js, as shown, for example, in FIGS. 21-22, to implement the rendering, refutation, emphasis, and propagation effects described below, operating over the PROV and DIVE representations.

Some schemes related to explainable planning focus on inspecting algorithms (i.e., explicating the decision-making process), synchronizing mental models (e.g., because the user views the problem differently than the planner), and improving usability (e.g., making complex plans more interpretable) and assumed fixed background domain knowledge. In contrast, the provenance-based approach treats the plan as a tripartite (Agents, Entities, and Activities) dependency graph. This adds connections among the plan's beliefs and goals (PROV entities), actions (PROV activities), and actors (PROV agents) via type-specific dependency relations. The plan's provenance graph connects to other provenance information (if available), including belief derivations (e.g., describing how initial state beliefs were inferred, as in FIG. 21), agent descriptions, and sensor descriptions (e.g., including reliability information), which comprise a larger global provenance graph. This complements previous explainable planning work with additional decision-relevant information and thereby new explanation capabilities.

Figure 23:
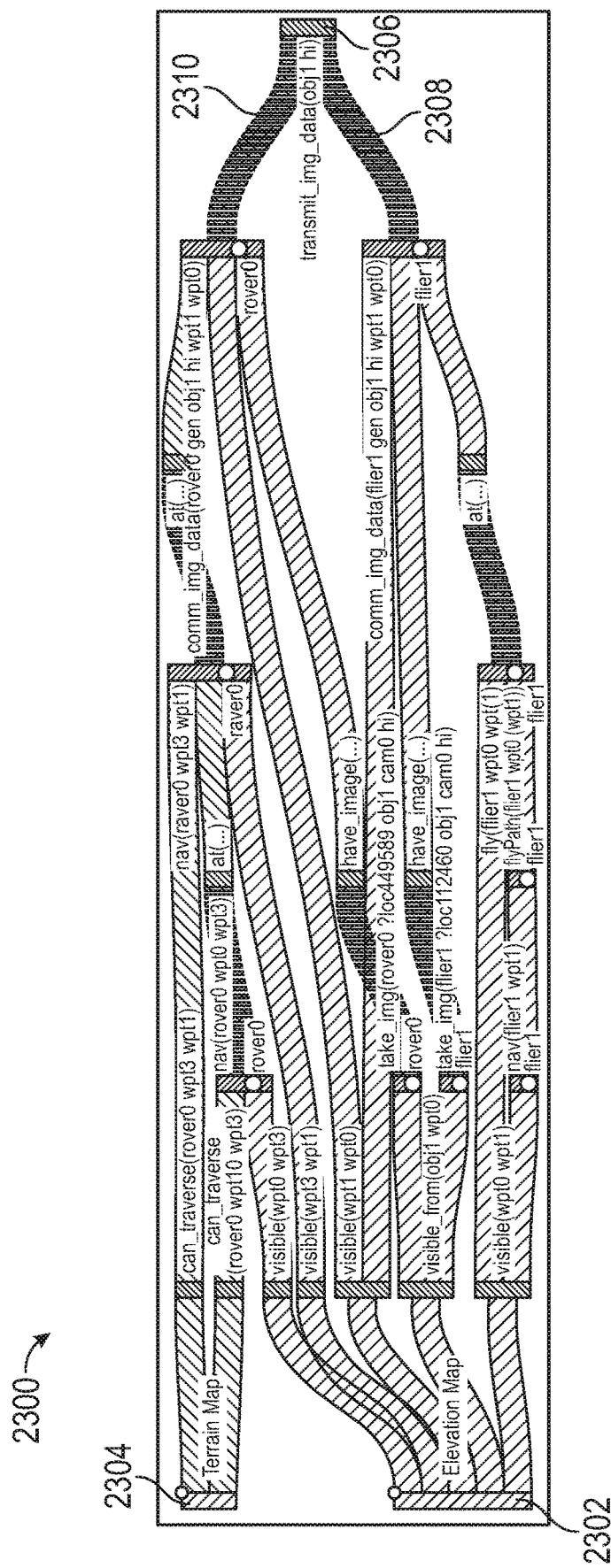
FIG. 23 illustrates an example graphical representation of a provenance-based plan, according to an embodiment.

Common question of information and plan analysis: How reliable is the information supporting this course of action? Some embodiments answer this question of information reliability with graph propagation, using all DIVE Appraisal instances with numerical confidence ratings and propagating them forward to estimate downstream nodes' confidence. FIG. 23 illustrates an example graphical representation 2300 of a provenance-based plan, according to an embodiment. The provenance-based plan of FIG. 23 appraises an elevation map 2302 with moderately high (0.80) confidence and appraises a terrain map 2304 with moderately low (0.20) confidence. As shown, the downstream goal 2306 is supported by two paths of varying estimated confidence—a high confidence path 2308 and a low confidence path 2310. The low confidence path 2310 begins at the Terrain Map 2304 and flows through the rover0 sub-plan. As shown, a conjunction is as reliable as the lowest-confidence upstream input and a disjunction is as reliable as the greatest-confidence source upstream. In other embodiments, Bayesian approaches may apply here.

Figure 24:
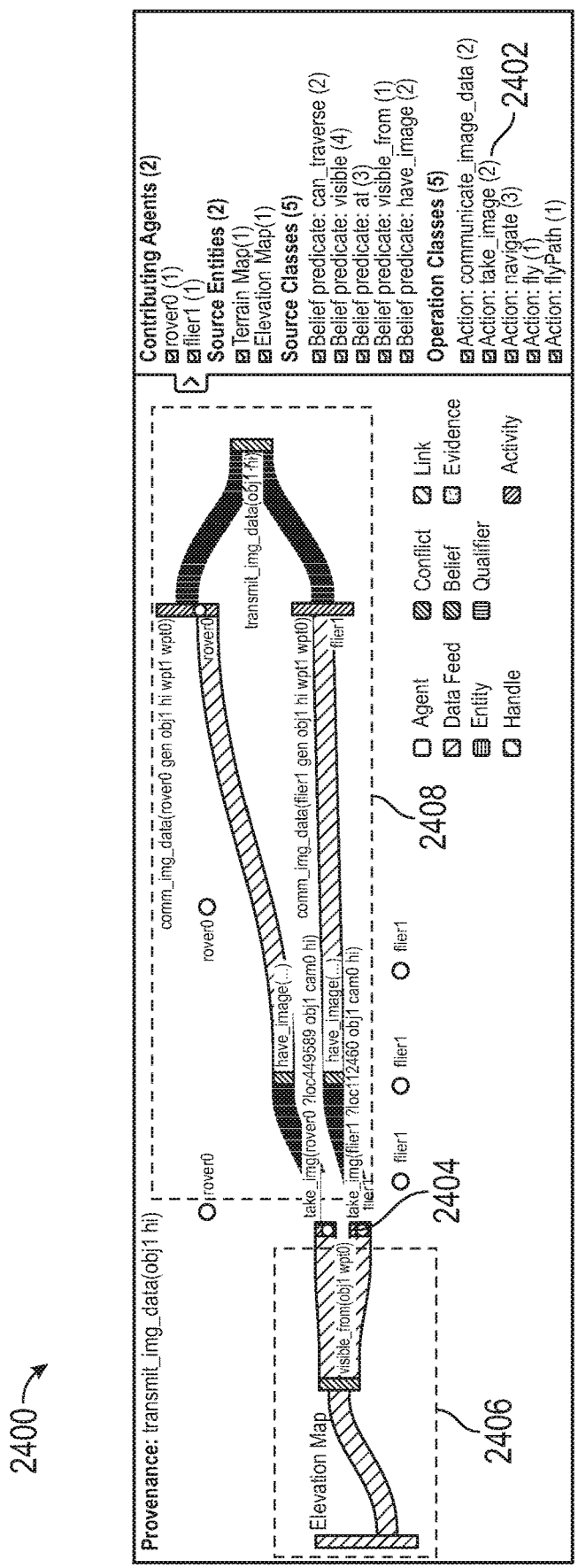
FIG. 24 illustrates an example graphical representation of a provenance-based plan with a selected action, according to an embodiment.

Common question of information and plan analysis: What information sources, sensors, or actors are pertinent to this [class of] belief or action? The disclosed system answers this question of information support using the precomputed environment to identify all upstream necessary and sufficient nodes in constant time. FIG. 24 illustrates an example graphical representation 2400 of a provenance-based plan with a selected action, according to an embodiment. FIG. 24 is a screenshot (graphical representation 2400) showing the effect of hovering over the take_image action 2402 in the right-hand panel. The system (1) identifies all nodes 2404 catalogued with that action, and then (2) de-emphasizes the nodes and paths that are not pertinent, so all relevant supporting nodes (upstream of the take_image nodes 2404) are available for assessment. As shown, the take_image actions rely on (1) a belief about objective visibility from way-point0 and (2) a high-confidence information source. The support region 2406 and the impact region 2408 of the take_image nodes 2404 is emphasized for the user's assessment. The support region 2406 is upstream from the take_image nodes 2404. The impact region 2408 is downstream from the take_image nodes 2404.

Common question of information and plan analysis: How far has this belief/agent/information source influenced the plan? Some approaches answer this impact assessment question using belief environments: the impact of a belief, agent, or information source m in the provenance graph is the set of elements with m in any subset of their environments. The impact of the take_image nodes 2404 is shown downstream of those nodes (impact region 2408) in FIG. 24: the take_image actions directly impact the communication of image data, in both sub-plans, thereby indirectly impacting the rightmost goal along both avenues.

Common question of information and plan analysis: How necessary are these sources, beliefs, actions, or actors for an action or goal? This is known as sensitivity analysis, and is answerable using environments, as defined above. Given an element m, we can answer whether one or more other elements N are necessary by computing m's environment contracted by N:

$$E(m)/N = \{S \in E(m) : N \cap S = \emptyset\}$$

If $E(m)/N = \emptyset$, at least one element in N is necessary for m. This allows some embodiments to interactively refute elements in the provenance graph and observe the downstream effects, answering counter-factual "what-if" questions about the necessity of information and actors in the plan.

Figure 25:
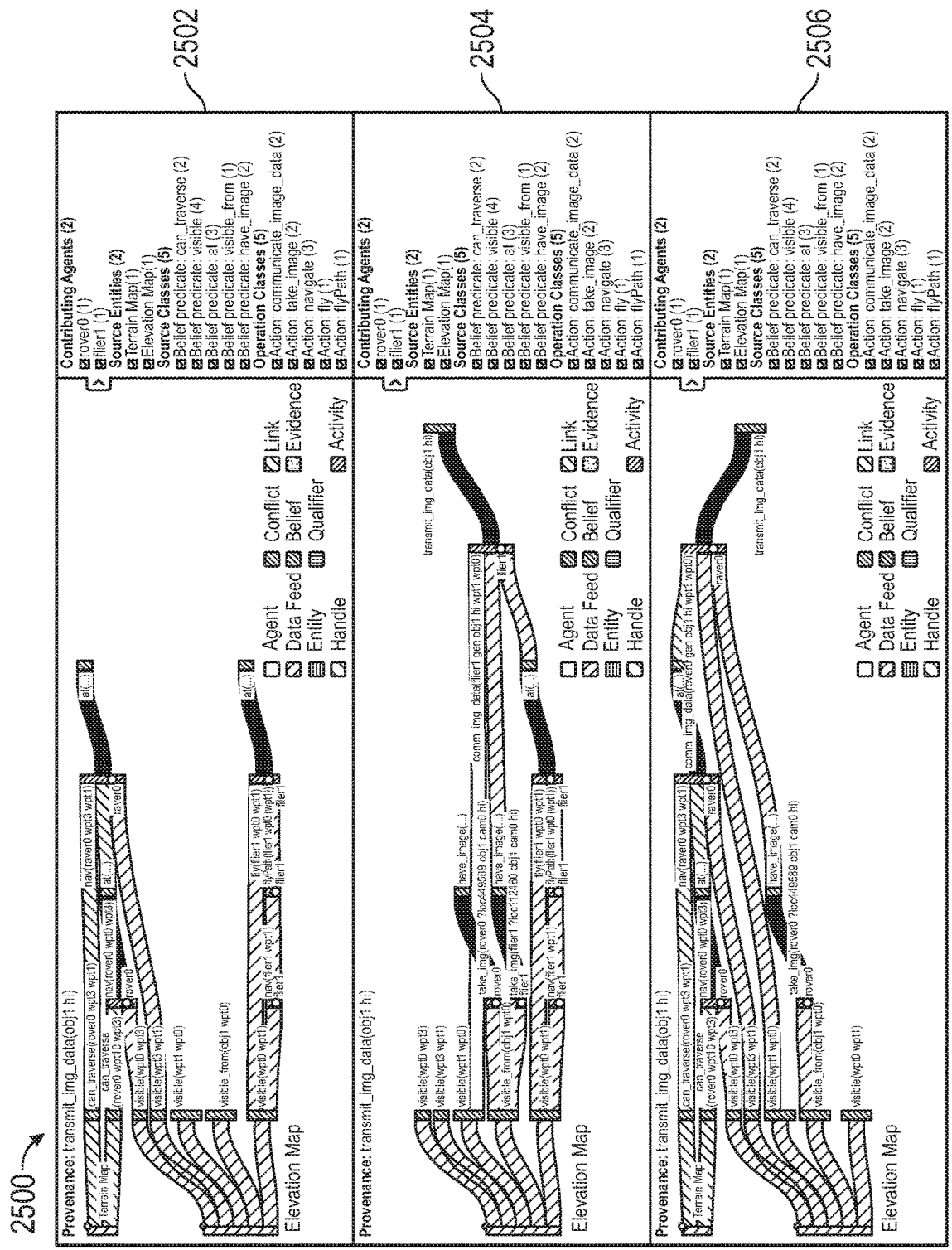
FIG. 25 illustrates example graphical representations of a provenance-based plan with various nodes of the provenance-based plan being refuted, according to an embodiment.

FIG. 25 illustrates example graphical representations of a provenance-based plan with various nodes of the provenance-based plan being refuted. In some embodiments, the disclosed system supports sensitivity analyses via dynamic refutation as shown in FIG. 25: the user may refute a class of elements (block 2502); information sources (block 2504); agents (block 2506); or any individual node. The disclosed system contracts nodes' belief environments, as described above, to identify downstream nodes that have lost all support. Note that the downstream goal is still reachable in two of the refutations of FIG. 25 (in block 2504 and in block 2506, but not in block 2502). However, the confidence of the goal varies depending on which elements are refuted.

Common question of information and plan analysis: What assumptions are necessary or sufficient to hold this belief or apply this planned action? Deriving beliefs from information sources often requires making some assumptions. For instance, using a rover's GPS sensor to measure its position assumes that the GPS sensor is on the rover. This assumption affects the integrity of all downstream beliefs and planned actions that rely directly or indirectly on positional data.

As with numerical confidence, we express assumptions using DIVE Appraisal instances related to the relevant elements (e.g., a GPS sensor). For any node m, we compute the set of necessary and sufficient upstream assumptions as the set of explicit assumptions on the necessary and sufficient nodes in E(m).

Common question of information and plan analysis: Why is that more efficient/safe/cheap than something else? In some embodiments, the provenance-based approach propagates confidence—or alternatively, source reliability or operational risk—downstream through the provenance graph, allowing upstream agents, beliefs, and information sources to color downstream actions and beliefs in the plan. This estimation of downstream confidence and risk (as an inverse of "safe," per the question) allows some embodiments to compare alternatives across numerical measures. In some embodiments, this question might not be fully addressed, since propagating confidence might not explain resource costs and efficiency.

Wealth Common question of information and plan analysis: Why does one [not] need to replan or repair the plan at this point? This extends to specific questions about plan robustness such as, "What can go wrong with this plan, and why?" e.g., "What will happen if this rover breaks down?" Connecting the rover to actions and goals that involve it enables the planning system to explain the overall impacts of such a query, rather than simply identify the chain of broken causal links in a single plan instance.

It may be useful to reassign a DIVE Appraisal of an entity, and the new values propagate after updating the confidence and reliability of the remaining plan components. Hence reducing the appraised reliability of a rover that seems likely to break down will downgrade the estimated confidence in the portion of the plan that the rover supports. Similarly, dynamically refuting the unreliable rover, as illustrated in FIG. 25, may remove elements of the plan that rely on it.

If there are still sufficient paths to the goal condition—or paths that are of the desired confidence—then the plan is robust enough to address the inquired failure points, and it does not require revision. Alternatively, if the remaining paths to the goal are not of a desired confidence, then these refuted elements (and the degraded paths) explain why re-planning or repairing the plan is desirable.

Figure 26:
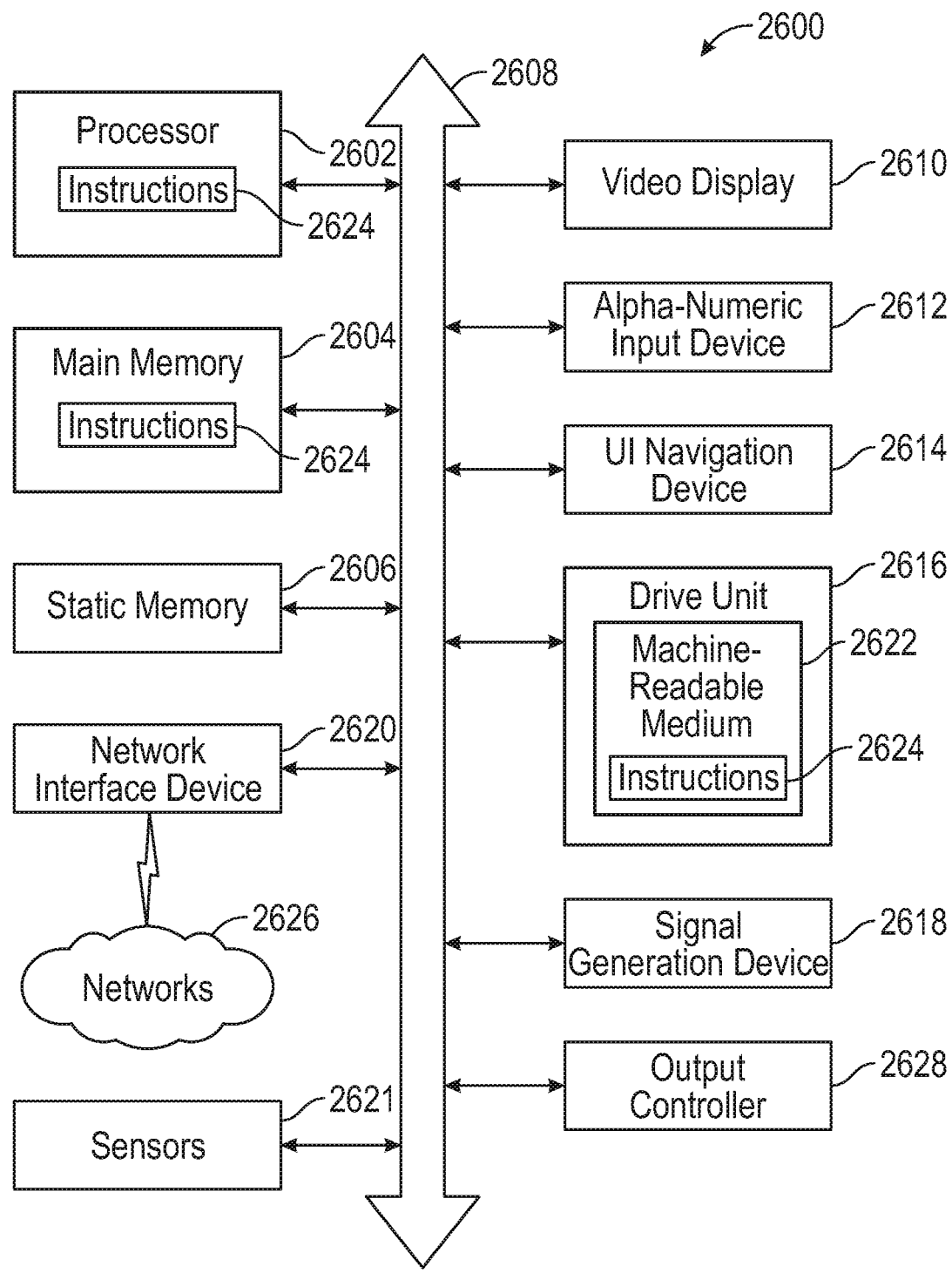
FIG. 26 is a block diagram of a computing machine, according to an embodiment.

FIG. 26 illustrates a circuit block diagram of a computing machine 2600 in accordance with some embodiments. In some embodiments, components of the computing machine 2600 may store or be integrated into other components shown in the circuit block diagram of FIG. 26. For example, portions of the computing machine 2600 may reside in the processor 2602 and may be referred to as "processing circuitry." Processing circuitry may include processing hardware, for example, one or more central processing units (CPUs), one or more graphics processing units (GPUs), and the like. In alternative embodiments, the computing machine 2600 may operate as a standalone device or may be connected (e.g., networked) to other computers. In a networked deployment, the computing machine 2600 may operate in the capacity of a server, a client, or both in server-client network environments. In an example, the computing machine 2600 may act as a peer machine in peer-to-peer (P2P) (or other distributed) network environment. In this document, the phrases P2P, device-to-device (D2D) and sidelink may be used interchangeably. The computing machine 2600 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 2600 may include a hardware processor 2602 (e.g., a central processing unit (CPU), a GPU, a hardware processor core, or any combination thereof), a main memory 2604 and a static memory 2606, some or all of which may communicate with each other via an interlink (e.g., bus) 2608. Although not shown, the main memory 2604 may contain any or all of removable storage and non-removable storage, volatile memory or non-volatile memory. The computing machine 2600 may further include a video display unit 2610 (or other display unit), an alpha-numeric input device 2612 (e.g., a keyboard), and a user interface (UI) navigation device 2614 (e.g., a mouse). In an example, the display unit 2610, input device 2612 and UI navigation device 2614 may be a touch screen display. The computing machine 2600 may additionally include a storage device (e.g., drive unit) 2616, a signal generation device 2618 (e.g., a speaker), a network interface device 2620, and one or more sensors 2621, such as a global positioning system (GPS) sensor, compass, accelerometer, or other sensor. The computing machine 2600 may include an output controller 2628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 2616 (e.g., a storage device) may include a machine readable medium 2622 on which is stored one or more sets of data structures or instructions 2624 (e.g., software) embodying or utilized by any one or more of the techniques or functions described herein. The instructions 2624 may also reside, completely or at least partially, within the main memory 2604, within static memory 2606, or within the hardware processor 2602 during execution thereof by the computing machine 2600. In an example, one or any combination of the hardware processor 2602, the main memory 2604, the static memory 2606, or the storage device 2616 may constitute machine readable media.

While the machine readable medium 2622 is illustrated as a single medium, the term "machine readable medium" may include a single medium or multiple media (e.g., a centralized or distributed database, and/or associated caches and servers) configured to store the one or more instructions 2624.

The term "machine readable medium" may include any medium that is capable of storing, encoding, or carrying instructions for execution by the computing machine 2600 and that cause the computing machine 2600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 2624 may further be transmitted or received over a communications network 2626 using a transmission medium via the network interface device 2620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2620 may include one or more physical jacks (e.g., Ethernet, coaxial, or phone jacks) or one or more antennas to connect to the communications network 2626.

Some embodiments are described below as numbered examples (Example 1, 2, 3 . . . ) These examples are provided as examples only and do not limit the disclosed technology.

Example 1 is a method implemented at one or more computing machines, the method comprising: accessing, in a graph data repository coupled with the one or more computing machines, a directed graph data structure representing one or more sequences of actions, the directed graph data structure comprising nodes and edges between the nodes, each node being either a beginning node, an intermediate node, or an end node, each intermediate node being downstream from at least one beginning node and upstream from at least one end node, each beginning node in at least a subset of the beginning nodes having an explainability value vector; computing, for each first node from among a plurality of first nodes that are intermediate nodes or end nodes, an explainability value vector, the explainability value vector for the first node being a computational combination of explainability value vectors of one or more nodes upstream from the first node, the computational combination of explainability value vectors being computed by propagating, within the directed graph data structure, values from the explainability value vectors of the one or more nodes upstream from the first node; computing, for each first node, a provenance value representing dependency of the explainability value vector of the first node on the one or more nodes upstream from the first node; and providing, using the one or more computing machines, a graphical output representing at least an explainability value vector of an end node.

In Example 2, the subject matter of Example 1 includes, wherein the graphical output comprises a graphical representation of the directed graph data structure, wherein the graphical output indicates the explainability value vector and the provenance value of each first node from among the plurality of first nodes.

In Example 3, the subject matter of Example 2 includes, adjusting, using the one or more computing machines, the graphical representation for display via a graphical user interface (GUI) at a display device; and providing, for display on the display device, a scroll bar and a scroll thumb for scrolling through the graphical representation, the scroll bar being operable to move through the graphical representation by manipulating the scroll thumb using the GUI.

In Example 4, the subject matter of Examples 1-3 includes, wherein each node in the directed graph data structure represents an entity, an activity or an agent, wherein the directed graph data structure comprises a tripartite dependency graph.

In Example 5, the subject matter of Examples 1-4 includes, wherein the explainability value vector comprises one or more of: an assumption value, a categorical value, a confidence value, a bias value, a risk value, a likelihood of success value, and a potential reward value.

In Example 6, the subject matter of Examples 1-5 includes, wherein at least one beginning node represents an information source or a data feed.

In Example 7, the subject matter of Examples 1-6 includes, wherein at least one intermediate node or at least one end node represents an action to perform, evidence, a belief or a hypothesis.

In Example 8, the subject matter of Examples 1-7 includes, wherein at least one end node represents a goal or an expected result.

In Example 9, the subject matter of Examples 1-8 includes, receiving a selection of a node; generating, for the selected node, a natural language sentence corresponding to the explainability value vector of the selected node or the provenance value of the selected node; and providing an output of the natural language sentence.

In Example 10, the subject matter of Example 9 includes, wherein the natural language sentence is generated by automatically populating fields of natural language templates based on values from the explainability value vector.

In Example 11, the subject matter of Examples 1-10 includes, receiving an input for adjusting an explainability value vector of at least one node from the directed graph data structure or removing a node from the directed graph data structure; and adjusting, for one or more first nodes from among a plurality of first nodes, the explainability value vector based on the provenance value of the one or more first nodes and the adjusted explainability value vector of the at least one node, wherein the one or more first nodes are different from the at least one node.

Example 12 is at least one machine-readable medium including instructions that, when executed by processing circuitry, cause the processing circuitry to perform operations to implement of any of Examples 1-11.

Example 13 is an apparatus comprising means to implement of any of Examples 1-11.

Example 14 is a system to implement of any of Examples 1-11.

Example 15 is a method to implement of any of Examples 1-11.

Embodiments of the present disclosure provide a number of technical improvements over conventional systems and methods. While the improvements will be apparent to those of skill in the art in view of the various embodiments described, a selection of such improvements is discussed herein.

Embodiments enable information processing by a plurality of agents in parallel to execute workflows both in synchronous and asynchronous manners. The systems and methods of the present disclosure can therefore be scaled through the provision of additional computing resources for the execution of agents, independently of the hardware and software implementation of other components of system 100. The information stored within data store 200 can also be updated as agents execute, enabling updated information to be displayed to the user as it is received.

Embodiments further provide efficient provenance analysis by storing the provenance information (through linked activity records) as datums are generated or retrieved. The provenance tracking is therefore distributed, and can be updated in real-time or near real-time. Storing the provenance graph and/or provenance tree as provided by embodiments reduces the need for post-processing to recreate the provenance of a datum or other item of information.

The provenance graph structure enables efficient attribute propagation. The information sources, software operations, and data types used for each activity can be propagated downstream through the provenance graph. This can enable embodiments to quickly summarize attributes of the agents and information sources relied on during the generation of an insight or belief. This can enable users to quickly assess the diversity of evidence supporting a piece of information.

Efficient attribute propagation also enables efficient updates to the visualized provenance in response to temporary refutations of information, activities, agents, sources, or classes thereof, from the analysis and assess the effect on downstream conclusions. This can enable users to quickly assess sensitivity of a piece of information to individual elements, or classes of elements.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed. Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method implemented at one or more computing machines, the method comprising:
    accessing, in a graph data repository coupled with the one or more computing machines, a directed graph data structure representing one or more sequences of actions in a plan being analyzed by the one or more computing machines, the directed graph data structure comprising nodes and edges between the nodes, each node being either a beginning node, an intermediate node, or an end node, each intermediate node being downstream from at least one beginning node and upstream from at least one end node, each beginning node in at least a subset of the beginning nodes having an explainability value vector, wherein the nodes comprise activity records or datums, wherein the datums comprise states or beliefs, wherein the edges represent dependency of a first node on a second node connected to the first node via the edge;
    computing, for each first node from among a plurality of first nodes that are intermediate nodes or end nodes, a provenance value representing dependency of an explainability value vector of the first node on the one or more nodes upstream from the first node;

computing, for each first node, the explainability value vector, the explainability value vector for the first node being a computational combination of explainability value vectors of one or more nodes upstream from the first node, the computational combination of explainability value vectors being computed by propagating, within the directed graph data structure, values from the explainability value vectors of the one or more nodes upstream from the first node;

accessing a provenance subgraph of the directed graph data structure for a specified datum, the provenance subgraph comprising nodes of the directed graph data structure that comprise activity records associated with the specified datum, wherein at least one activity record in the provenance subgraph is supported by received datums from multiple agents, wherein at least one datum record from the directed graph data structure is supported by multiple activity records, wherein data associated with the at least one datum record is received via an agent interface from an agent, wherein each activity record of the activity records identifies the agent associated with an activity of the activity record and the at least one datum record that the activity record supports;

applying a trust parameter to the provenance subgraph by augmenting each activity record of the provenance subgraph with a trust modifier based on the trust parameter, wherein the trust parameter is used to logically falsify a part of the provenance subgraph, the part of the provenance subgraph comprising at least one initial node and nodes downstream from the at least one initial node;

providing, a graphical user interface (GUI) at a display device at a display device using the one or more computing machines, a graphical output representing at least an explainability value vector of an end node and the logically falsified part of the provenance subgraph;

receiving a selection of a node from a user via the GUI;

generating, for the selected node, a natural language sentence corresponding to the explainability value vector of the selected node or the provenance value of the selected node;

and providing an output of the natural language sentence via the GUI that is generated by automatically populating fields of natural language templates based on values from the explainability value vector.

2. The method of claim 1, wherein the graphical output comprises a graphical representation of the directed graph data structure, wherein the graphical output indicates the explainability value vector and the provenance value of each first node from among the plurality of first nodes.

3. The method of claim 2, further comprising:
adjusting, using the one or more computing machines, the graphical representation for display via the GUI at the display device; and
providing, for display on the display device, a scroll bar and a scroll thumb for scrolling through the graphical representation, the scroll bar being operable to move through the graphical representation by manipulating the scroll thumb using the GUI.

4. The method of claim 1, wherein each node in the directed graph data structure represents an entity, an activity or an agent, wherein the directed graph data structure comprises a tripartite dependency graph.

5. The method of claim 1, wherein the explainability value vector comprises one or more of: an assumption value, a categorical value, a confidence value, a bias value, a risk value, a likelihood of success value, and a potential reward value.

6. The method of claim 1, wherein at least one beginning node represents an information source or a data feed.

7. The method of claim 1, wherein at least one intermediate node or at least one end node represents an action to perform, evidence, a belief or a hypothesis.

8. The method of claim 1, wherein at least one end node represents a goal or an expected result.

9. The method of claim 1, further comprising:
receiving an input from the user via the GUI for adjusting an explainability value vector of at least one node from the directed graph data structure or removing a node from the directed graph data structure; and
adjusting, for one or more first nodes from among a plurality of first nodes, the explainability value vector based on the provenance value of the one or more first nodes and the adjusted explainability value vector of the at least one node, wherein the one or more first nodes are different from the at least one node.

10. The method of claim 1, wherein the at least one activity record comprises an agent identifier, wherein the agent identifier identifies a user, a computing hardware or a software used to create the activity record.

11. The method of claim 1, wherein the part of the provenance subgraph being logically falsified comprises propagation of falsification-related information across the part of the provenance subgraph.

12. The method of claim 11, wherein the falsification-related information comprises activity records or contributing agents.

13. The method of claim 11, wherein the part of the provenance subgraph being logically falsified causes the provenance visualizer to display the provenance subgraph with nodes in the part of the provenance subgraph shown in a specified color or opacity.

14. The method of claim 11, wherein the part of the provenance subgraph being logically falsified comprises recording of falsification of a class of agents, activities, or data.

15. The method of claim 14, wherein the part of the provenance subgraph being logically falsified comprises logically falsifying any element dependent on a member of a class of elements that has been falsified.

16. The method of claim 1, wherein the graphical output comprises a visual representation of the provenance subgraph, wherein the logically falsified part of the provenance subgraph is visually indicated within the visual representation of the provenance subgraph.

17. A non-transitory machine-readable medium storing instruction which, when executed at one or more computing machines, cause the one or more computing machines to perform operations comprising:
accessing, in a graph data repository coupled with the one or more computing machines, a directed graph data structure representing one or more sequences of actions in a plan being analyzed by the one or more computing machines, the directed graph data structure comprising nodes and edges between the nodes, each node being either a beginning node, an intermediate node, or an end node, each intermediate node being downstream from at least one beginning node and upstream from at least one end node, each beginning node in at least a subset of the beginning nodes having an explainability value vector, wherein the nodes comprise activity records or datums, wherein the datums comprise states or beliefs, wherein the edges represent dependency of a first node on a second node connected to the first node via the edge;

computing, for each first node from among a plurality of first nodes that are intermediate nodes or end nodes, a provenance value representing dependency of an explainability value vector of the first node on the one or more nodes upstream from the first node;

computing, for each first node, the explainability value vector, the explainability value vector for the first node being a computational combination of explainability value vectors of one or more nodes upstream from the first node, the computational combination of explainability value vectors being computed by propagating, within the directed graph data structure, values from the explainability value vectors of the one or more nodes upstream from the first node;

accessing a provenance subgraph of the directed graph data structure for a specified datum, the provenance subgraph comprising nodes of the directed graph data structure that comprise activity records associated with the specified datum, wherein at least one activity record in the provenance subgraph is supported by received datums from multiple agents, wherein at least one datum record from the directed graph data structure is supported by multiple activity records, wherein data associated with the at least one datum record is received via an agent interface from an agent, wherein each activity record of the activity records identifies the agent associated with an activity of the activity record and the at least one datum record that the activity record supports;

applying a trust parameter to the provenance subgraph by augmenting each activity record of the provenance subgraph with a trust modifier based on the trust parameter, wherein the trust parameter is used to logically falsify a part of the provenance subgraph, the part of the provenance subgraph comprising at least one initial node and nodes downstream from the at least one initial node;

providing, a graphical user interface (GUI) at a display device at a display device using the one or more computing machines, a graphical output representing at least an explainability value vector of an end node and the logically falsified part of the provenance subgraph;

receiving a selection of a node from a user via the GUI;

generating, for the selected node, a natural language sentence corresponding to the explainability value vector of the selected node or the provenance value of the selected node;

and providing an output of the natural language sentence via the GUI that is generated by automatically populating fields of natural language templates based on values from the explainability value vector.

18. The machine-readable medium of claim 17, wherein the graphical output comprises a graphical representation of the directed graph data structure, wherein the graphical output indicates the explainability value vector and the provenance value of each first node from among the plurality of first nodes.

19. The machine-readable medium of claim 18, the operations further comprising:

adjusting, using the one or more computing machines, the graphical representation for display the GUI at the display device; and providing, for display on the display device, a scroll bar and a scroll thumb for scrolling through the graphical representation, the scroll bar being operable to move through the graphical representation by manipulating the scroll thumb using the GUI.

20. The machine-readable medium of claim 17, wherein each node in the directed graph data structure represents an entity, an activity or an agent, wherein the directed graph data structure comprises a tripartite dependency graph.

21. The machine-readable medium of claim 17, wherein the explainability value vector comprises one or more of: an assumption value, a categorical value, a confidence value, a bias value, a risk value, a likelihood of success value, and a potential reward value.

22. A system comprising:

processing circuitry of one or more computing machines; and a memory storing instructions which, when executed by the processing circuitry, cause the processing circuitry to perform operations comprising:

accessing, in a graph data repository coupled with the one or more computing machines, a directed graph data structure representing one or more sequences of actions in a plan being analyzed by the one or more computing machines, the directed graph data structure comprising nodes and edges between the nodes, each node being either a beginning node, an intermediate node, or an end node, each intermediate node being downstream from at least one beginning node and upstream from at least one end node, each beginning node in at least a subset of the beginning nodes having an explainability value vector, wherein the nodes comprise activity records or datums, wherein the datums comprise states or beliefs, wherein the edges represent dependency of a first node on a second node connected to the first node via the edge;

computing, for each first node from among a plurality of first nodes that are intermediate nodes or end nodes, a provenance value representing dependency of an explainability value vector of the first node on the one or more nodes upstream from the first node;

computing, for each first node, the explainability value vector, the explainability value vector for the first node being a computational combination of explainability value vectors of one or more nodes upstream from the first node, the computational combination of explainability value vectors being computed by propagating, within the directed graph data structure, values from the explainability value vectors of the one or more nodes upstream from the first node;

accessing a provenance subgraph of the directed graph data structure for a specified datum, the provenance subgraph comprising nodes of the directed graph data structure that comprise activity records associated with the specified datum, wherein at least one activity record in the provenance subgraph is supported by received datums from multiple agents, wherein at least one datum record from the directed graph data structure is supported by multiple activity records, wherein data associated with the at least one datum record is received via an agent interface from an agent, wherein each activity record of the activity records identifies the agent associated with an activity of the activity record and the at least one datum record that the activity record supports;

applying a trust parameter to the provenance subgraph by augmenting each activity record of the provenance subgraph with a trust modifier based on the trust parameter, wherein the trust parameter is used to logically falsify a part of the provenance subgraph, the part of the provenance subgraph comprising at least one initial node and nodes downstream from the at least one initial node;

providing, a graphical user interface (GUI) at a display device at a display device using the one or more computing machines, a graphical output representing at least an explainability value vector of an end node;

receiving a selection of a node from a user via the GUI;

generating, for the selected node, a natural language sentence corresponding to the explainability value vector of the selected node or the provenance value of the selected node;

and providing an output of the natural language sentence via the GUI that is generated by automatically populating fields of natural language templates based on values from the explainability value vector.

23. The system of claim 22, wherein the graphical output comprises a graphical representation of the directed graph data structure, wherein the graphical output indicates the explainability value vector and the provenance value of each first node from among the plurality of first nodes.

24. The system of claim 23, the operations further comprising:

adjusting, using the one or more computing machines, the graphical representation for display via the GUI at the display device; and providing, for display on the display device, a scroll bar and a scroll thumb for scrolling through the graphical representation, the scroll bar being operable to move through the graphical representation by manipulating the scroll thumb using the GUI.

25. The system of claim 22, wherein each node in the directed graph data structure represents an entity, an activity or an agent, wherein the directed graph data structure comprises a tripartite dependency graph.

* * * * *